United States Patent
Hotchkiss et al.

(10) Patent No.: US 9,973,805 B1
(45) Date of Patent: *May 15, 2018

(54) VIEWER TRAFFIC VISUALIZATION PLATFORM

(71) Applicant: Domo, Inc., American Form, UT (US)

(72) Inventors: Wes Hotchkiss, Salt Lake City, UT (US); Sam Thomas, Lehi, UT (US); Jared Cook, Lehi, UT (US)

(73) Assignee: Domo, Inc., American Fork, UT (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/255,142

(22) Filed: Sep. 2, 2016

Related U.S. Application Data

(63) Continuation of application No. 14/855,250, filed on Sep. 15, 2015, now Pat. No. 9,467,745.
(Continued)

(51) Int. Cl.
*H04N 7/16* (2011.01)
*H04N 7/173* (2011.01)
(Continued)

(52) U.S. Cl.
CPC ..... *H04N 21/4312* (2013.01); *G06F 3/04847* (2013.01); *G06T 11/206* (2013.01);
(Continued)

(58) Field of Classification Search
CPC .......... H04N 21/64723; H04N 21/2402; H04L 12/2418; H04L 12/2626
(Continued)

(56) References Cited

U.S. PATENT DOCUMENTS

| 6,564,381 B1 | 5/2003 | Hodge et al. |
| D496,666 S | 9/2004 | Krakirian et al. |
| (Continued) | | |

FOREIGN PATENT DOCUMENTS

WO 2012087954 A2 6/2012

OTHER PUBLICATIONS

Vector—clock and time icons, [online] posted Jun. 7, 2013, retrieved Apr. 4, 2016, retrieved from http://www.canstockphoto.com/images-photos/hourglass-vector.html#file_view.php?id=14344519 (2 pages).
(Continued)

*Primary Examiner* — Pankaj Kumar
*Assistant Examiner* — Franklin Andramuno
(74) *Attorney, Agent, or Firm* — Patent Law Works LLP

(57) ABSTRACT

An example implementation includes a computer-implemented method including generating at a user device a dynamic user-interactable graphical interface using a performance summary including viewer traffic statistics for a first show. The performance summary includes an inbound viewer rate and an outbound viewer rate for each of a plurality of discrete time intervals of the first show. The interface includes a graphical traffic meter that visually comparatively displays the inbound viewer rate and the outbound viewer rate corresponding to a selected time interval. The method further provides the interface for display via a display device associated with the user device, receives from an input device associated with the user device a user input selecting from the interface a time interval of the first show, and updates the meter to comparatively display the inbound viewer rate and the outbound viewer rate corresponding to the time interval selected by the user input.

26 Claims, 13 Drawing Sheets

Related U.S. Application Data

(60) Provisional application No. 62/143,758, filed on Apr. 6, 2015.

(51) Int. Cl.

| | | |
|---|---|---|
| *H04N 21/431* | (2011.01) | |
| *G06T 11/20* | (2006.01) | |
| *G06F 3/0484* | (2013.01) | |
| *H04N 21/442* | (2011.01) | |
| *H04N 21/81* | (2011.01) | |
| *H04N 21/426* | (2011.01) | |
| *H04N 21/43* | (2011.01) | |
| *H04N 21/478* | (2011.01) | |
| *H04N 21/647* | (2011.01) | |
| *H04N 21/24* | (2011.01) | |

(52) U.S. Cl.
CPC ... *H04N 21/2402* (2013.01); *H04N 21/42653* (2013.01); *H04N 21/4307* (2013.01); *H04N 21/44222* (2013.01); *H04N 21/478* (2013.01); *H04N 21/64723* (2013.01); *H04N 21/812* (2013.01); *H04N 21/8153* (2013.01); *G06F 3/04842* (2013.01); *G06F 3/04845* (2013.01)

(58) Field of Classification Search
USPC .................................. 725/9, 86, 89
See application file for complete search history.

(56) References Cited

U.S. PATENT DOCUMENTS

| | | | |
|---|---|---|---|
| D536,340 S | 2/2007 | Jost et al. | |
| 7,641,924 B2 | 1/2010 | Mizumoto et al. | |
| D638,024 S | 5/2011 | Wall et al. | |
| D652,048 S | 1/2012 | Joseph | |
| D692,019 S | 10/2013 | Baumann | |
| D711,912 S | 8/2014 | Alldredge et al. | |
| D717,331 S | 11/2014 | Lin | |
| D720,362 S | 12/2014 | Schoger et al. | |
| D720,366 S | 12/2014 | Hiltunen et al. | |
| 8,954,536 B2 | 2/2015 | Kalus et al. | |
| D729,269 S | 5/2015 | Trusz et al. | |
| D741,888 S | 10/2015 | Sic et al. | |
| D741,896 S | 10/2015 | Park et al. | |
| D743,423 S | 11/2015 | Danielyan et al. | |
| D745,880 S | 12/2015 | Lima et al. | |
| D750,664 S | 3/2016 | Chen et al. | |
| D751,091 S | 3/2016 | Suzuki | |
| D751,102 S | 3/2016 | Kim | |
| D754,703 S | 4/2016 | Moon et al. | |
| D759,076 S | 6/2016 | Bain | |
| D766,321 S | 9/2016 | Han et al. | |
| D766,956 S | 9/2016 | Eder | |
| D769,908 S | 10/2016 | Cook | |
| 9,467,745 B1 | 10/2016 | Hotchkiss et al. | |
| D778,932 S | 2/2017 | Hotchkiss et al. | |
| D778,933 S | 2/2017 | Hotchkiss et al. | |
| D779,524 S | 2/2017 | Hotchkiss et al. | |
| D780,213 S | 2/2017 | Hotchkiss et al. | |
| 9,664,492 B2 | 5/2017 | Alldredge et al. | |
| D792,431 S | 7/2017 | Grassle et al. | |
| D792,437 S | 7/2017 | Cianflone et al. | |
| 2004/0045024 A1 | 3/2004 | Marshall et al. | |
| 2005/0171760 A1 | 8/2005 | Tinkler | |
| 2006/0015890 A1* | 1/2006 | Kasutani | G11B 27/031 725/9 |
| 2008/0250341 A1 | 10/2008 | Dlugos et al. | |
| 2009/0182614 A1 | 7/2009 | Kekre | |
| 2012/0174013 A1 | 7/2012 | Kraus et al. | |
| 2012/0215621 A1 | 8/2012 | Heffernan et al. | |
| 2013/0282898 A1 | 10/2013 | Kalus et al. | |
| 2014/0095702 A1 | 4/2014 | Kalus et al. | |
| 2015/0121441 A1 | 4/2015 | Apte et al. | |
| 2015/0220535 A1 | 8/2015 | Palmer et al. | |
| 2015/0289823 A1 | 10/2015 | Rack-Gomer et al. | |
| 2015/0331587 A1 | 11/2015 | Van Der Westhuizen et al. | |

OTHER PUBLICATIONS comSCORE; From TV to Total Video, 2014; http://www.comscore.com/Insights/Presentations-and-Whitepapers/2014/From-TV-to-Total-Video (18 pages).
comSCORE; Video Metrix Multi Platform, 2014; http://www.comscore.com/Products/Audience-Analytics/Video-Metrix-Multi-Platform (2 pages).
Social Code, "A Winning Super Bowl Digital Advertising Strategy," http://socialcode.com/thought-leadership/blog/winning-super-howl-digital-advertising-strategy/, Jan. 22, 2015 (5 pages).
Wikipedia; Audience measurement, Feburary 16, 2015; https://en.wikipedia.org/w/index.php?title=Audience_measurement&oldid=647394712 (10 pages).
Cable TV: Prime-Time Viewership, by Channel, http://www.journalism.org/media-indicators/cable-news-prime-time-viewership/, download from internet Mar. 8, 2016 (1 page).
Clicky Web Analytics, https://clicky.com/stats/?site_id=32020, download from internet Mar. 8, 2016 (2 pages).
"Nielsen: Solutions", http://www.nielsen.com/us/en/solutions/measurement/television.html, download from internet Mar. 8, 2016 (4 pages).
YouGovBrandIndex, http://www.brandindex.com/about/what-can-i-use-brandindex, download from internet Mar. 8, 2016 (1 page).

* cited by examiner

VIEWER TRAFFIC VISUALIZATION PLATFORM

CROSS-REFERENCE TO RELATED APPLICATIONS

This application is a continuation of U.S. application Ser. No. 14/855,250, entitled "Viewer Traffic Visualization Platform", filed Sep. 15, 2015, which claims the benefit under 35 U.S.C. § 119(e) of U.S. Provisional Patent Application No. 62/143,758, entitled "Viewer Traffic Visualization Platform" and filed Apr. 6, 2015, the entire contents of each of which are incorporated herein by reference.

BACKGROUND

The present specification generally relates to technology for visualizing viewer traffic, such as, but not limited to, the viewer traffic of a given show relative to other competing show(s) and/or content provider(s).

Audience measurement systems, such as the audience measurement system provided by Nielsen, are capable of measuring TV viewing behavior by capturing data from national and local meters installed in the homes of a segment of the population and analyzing that data to determine how many people are watching the various shows that are on air. Other solutions measure viewer habits on other platforms, such as web-browsers, mobile apps, over-the-top (OTT) apps, etc.

However, these audience measurement systems, in many aspects, lack the ability to provide convenient virtual tools for analyzing, visualizing, and navigating the data being collected. Rather, the systems often merely provide raw data describing user behavior that is difficult to process for essential information about a show or merely provide standard statistics such as a show's demographic, reach, gross reach, cumulative reach, television rating point (TVR), etc., which often do not provide insights into the actual content of a given show, or the reasons viewers are not watching the show.

In addition, with the advent of the Internet, viewers are increasingly consuming video content online using a variety of different viewing platforms, such as smart phones, web-enabled TVs, tablets, laptops, etc., instead of using traditional broadcasting platforms, such as watching over-the-air television broadcasts. Existing audience measurement systems are unable to monitor all of these different platforms for a number of reasons including that they do not have access to those platforms or the back end systems providing content to those platforms, they are unable to keep up with the current rate of innovation and the diversification of viewing options, they only specialize in or focus on a certain segment (e.g., browser-based video, app-based video, satellite TV, cable TV, over-the-air (OTA) TV, etc.), etc.

As a result, content producers are unable to effectively monitor the performance of their content across the different viewing platforms that are currently available, and in many cases have to guess the reasons why a given show is under or over performing. Furthermore, content producers are unable to conveniently visualize essential information about a given show using existing solutions, such as how many viewers are abandoning a show at various different points of the show, the specific reasons viewers are abandoning a show (e.g., is it because of reasons external to the show, the episode itself or the entire series, certain people on the show, etc.), how a given show stacks up to other shows at different points of time of the show, etc.

SUMMARY

According to one innovative aspect of the subject matter described in this disclosure, a system includes one or more processors; a data handler executable by the one or more processors to receive a show performance summary including viewer traffic statistics for a first show and one or more competing shows at discrete time intervals of the first show and the one or more competing shows; a visualization module executable by the one or more processors to generate a dynamic user-interactable graphical interface using the performance summary and provide the dynamic user-interactable graphical interface for display via a display device, the dynamic user-interactable graphical interface to graphically display a comparison of viewer traffic between the first show and the one or more competing shows at the discrete time intervals; an interface module executable by the one or more processors to receive from an input device a user input selecting from the dynamic user-interactable graphical interface a time interval of the first show and the one or more competing shows, the interface module being coupled to the visualization module to provide the user input to the visualization module; and the visualization module being further executable by the one or more processors to update the dynamic user-interactable graphical interface provided for display via the display device with the comparison of the viewer traffic between the first show and the one or more competing shows at the time interval selected by the user input.

In general, another innovative aspect of the subject matter described in this disclosure may be embodied in a computer-implemented method that includes generating at a user device a dynamic user-interactable graphical interface using a performance summary including viewer traffic statistics for a first show and one or more competing shows at discrete time intervals of the first show and the one or more competing shows, the dynamic user-interactable graphical interface being configured to graphically display a comparison of inbound and outbound viewer traffic between the first show and the one or more competing shows at the discrete time intervals; providing the dynamic user-interactable graphical interface for display via a display device associated with the user device; receiving from an input device associated with the user device a user input selecting from the dynamic user-interactable graphical interface a time interval of the first show and the one or more competing shows; and updating the dynamic user-interactable graphical interface provided for display via the display device with the comparison of the viewer traffic between the first show and the one or more competing shows at the time interval selected by the user input.

Other aspects include corresponding methods, systems, apparatus, and computer program products for these and other innovative aspects. Further advantages and benefits of the technology described herein are provided throughout this disclosure.

These and other implementations may each optionally include one or more of the following features. For instance, the features may include that generating the dynamic user-interactable graphical interface includes generating a virtual handle draggable within the dynamic user-interactable graphical interface by the user to isolate the viewer traffic associated with a certain discrete time interval from among the discrete time intervals of the viewer traffic, and the time interval selected by the user input is the certain discrete time interval selected by the user using the virtual handle; that the performance summary includes an inbound viewer rate and an outbound viewer rate for each of the discrete time intervals of the first show; that generating the dynamic user-interactable graphical interface includes generating a graphical traffic meter that visually comparatively displays the inbound viewer rate and the outbound viewer rate corresponding to a selected time interval; and that updating the dynamic user-interactable graphical interface includes updating the graphical traffic meter to comparatively display the inbound viewer rate and the outbound viewer rate corresponding to the time interval selected by the user input.

For instance, the features may further include that the performance summary includes a ranked list of inbound sources for each of the discrete time intervals of the first show and a ranked list of outbound sources for each of the discrete time intervals of the first show; that generating the graphical traffic meter includes generating a source comparison chart in association with the graphical traffic meter that visually comparatively displays the ranked list of inbound sources and the ranked list of outbound sources for the selected time interval; that updating the dynamic user-interactable graphical interface includes synchronously updating the graphical traffic meter and the source comparison chart based on the time interval selected by the user input; that the performance summary includes an average total number of viewers at each of the discrete time intervals for each of the first show and the one or more competing shows; that generating the dynamic user-interactable graphical interface includes generating a traffic chart using the average total number of viewers for each of the first show and the one or more competing shows; that the traffic chart visually comparatively displaying a traffic rate of the first show to one or more traffic rates associated with the one or more competing shows, respectively; that updating the dynamic user-interactable graphical interface includes synchronously updating the graphical traffic meter and the traffic chart with information corresponding to the selected time interval; that the performance summary includes viewer loss percentages for each of the discrete time intervals of the first show; that generating the dynamic user-interactable graphical interface includes generating a traffic loss chart using the total viewer loss percentages of the first show; that updating the dynamic user-interactable graphical interface includes synchronously updating the graphical traffic meter, the traffic chart, and the traffic loss chart with information corresponding to the selected time interval; that the performance summary includes commercial occurrence data reflecting one or more commercials presented during a showing of the first show and including one or more timestamps associated with the one or more commercials reflecting when the one or more commercials occurred; and that generating the dynamic user-interactable graphical interface includes generating one or more visual overlays corresponding to the one or more timestamps of the one or more commercials and including the one or more visual indicators in the comparison of viewer traffic between the first show and the one or more competing shows at the discrete time intervals.

For instance, the features may further include aggregating measurement data via a computer network from one or more information sources including raw viewer traffic statistics for the discrete time intervals of the first show, the first show being viewable by viewers via one or more viewing platforms and being associated with a first content provider; generating using a server device or the user device the show performance summary based on the measurement data; that generating the show performance summary based on the measurement data includes determining, using the raw viewer traffic statistics, an inbound viewer rate and an outbound viewer rate for each of the different time intervals of the first show, and one or more inbound viewer rates and one or more outbound viewer rates for each of the different time intervals of the one or more competing shows, determining, using the raw viewer traffic statistics, a viewer loss percentage for each of the discrete time intervals, determining, using the raw viewer traffic statistics, from the measurement data a ranked list of inbound sources for each of the different time intervals of the first show, the ranked list of inbound sources being ranked based on a number of inbound viewers associated with each of the inbound sources at a time interval to which the list corresponds, and determining, using the raw viewer traffic statistics, a ranked list of outbound sources for each of the different time intervals of the first show, the ranked list of outbound sources being ranked based on a number of outbound viewers associated with each of the outbound sources at a time interval to which the list corresponds; that aggregating the measurement data includes receiving the measurement data from the one or more information sources in real-time, near real-time, or delayed time; that the one or more information sources include one or more of a third-party audience measurement service and an information system associated with the first content provider; and that the one or more viewing platforms include one or more of Internet-connected devices, over-the-air televisions, cable televisions, and satellite televisions.

In general, another innovative aspect of the subject matter described in this disclosure may be embodied in a computer-implemented method including aggregating, using the one or more computing devices, measurement data from one or more information sources reflecting viewer traffic at discrete time intervals of a first show, the first show being viewable by viewers via one or more viewing platforms and being associated with a first content provider; determining, using the measurement data, inbound viewer rates and outbound viewer rates for the discrete time intervals of the first show; and generating for presentation on an electronic display using the one or more computing devices a dynamic graphical comparison between the ranked inbound sources and the ranked outbound sources at the discrete time intervals.

The technology described herein is particularly advantageous in a number of respects. For instance, the technology can provide convenient virtual tools for analyzing, visualizing, and navigating collected data regarding the performance of shows. Additionally, the technology can provide a platform for monitoring data for shows broadcast over a variety of viewing platforms. Furthermore, aspects of the invention allow a user to conveniently visualize essential information about a given show and competing shows. However, it should be understood that this list of features and advantages is provided by way of example, and that numerous additional features and advantages are also applicable and contemplated. Additionally, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
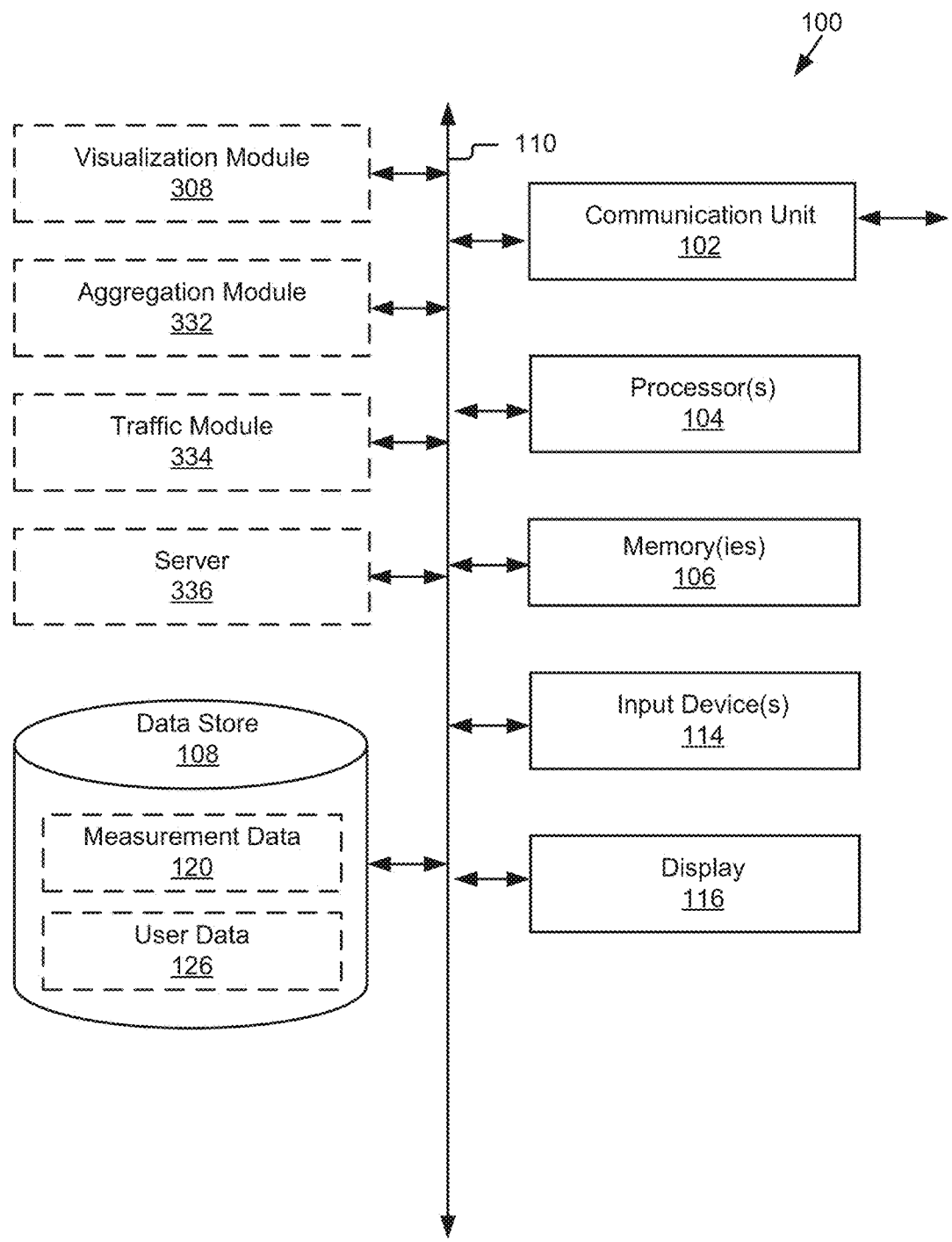
FIG. 1 is a block diagram illustrating an example computing device for providing a viewer traffic visualization platform.
Figure 3:
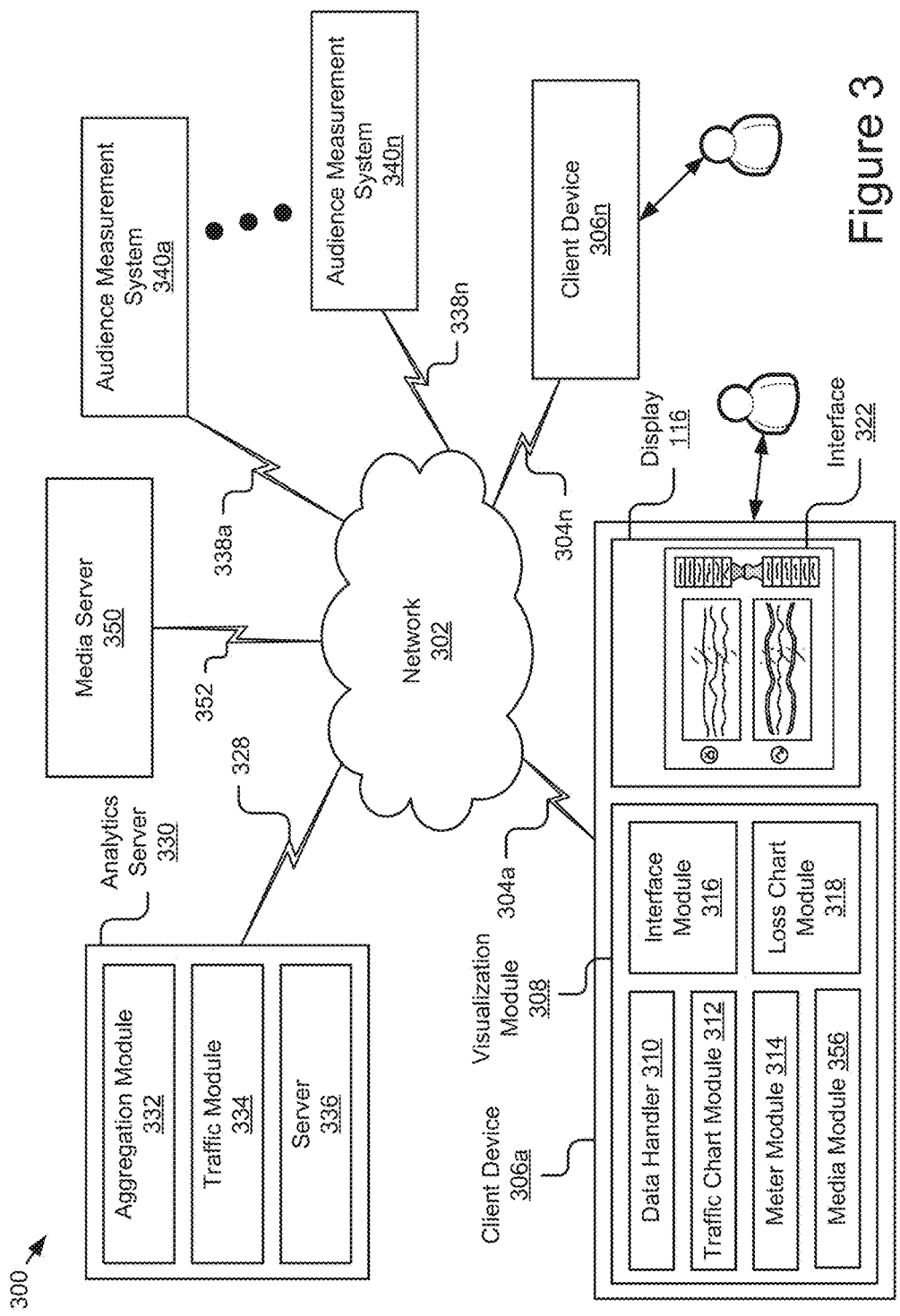
FIG. 3 is a block diagram of an example system for analyzing and enabling visualization of viewer traffic.

FIG. 1 is a block diagram of an example computing system 100, various configurations of which may represent the computer architecture of a client devices 306a . . . 306n (also referred to herein individually and/or collectively as 306) and/or an analytics server 330, such as those depicted in FIG. 3.

As depicted in FIG. 1, and further in FIG. 3, the computing system 100 may include a visualization module 308, an aggregation module 332, a traffic module 334, and a server 336, depending on the configuration. For instance, as shown in FIG. 3, a client device 306 may include the visualization module 308 and the analytics server 330 may include the aggregation module 332, the traffic module 334, and the server 336, although other configurations are also possible and contemplated, such as where the aggregation module 332 and/or the traffic module 334, or various components and/or functions thereof, are incorporated into the client device 306, the visualization module 308, and/or the analytics server 330.

Figure 8:
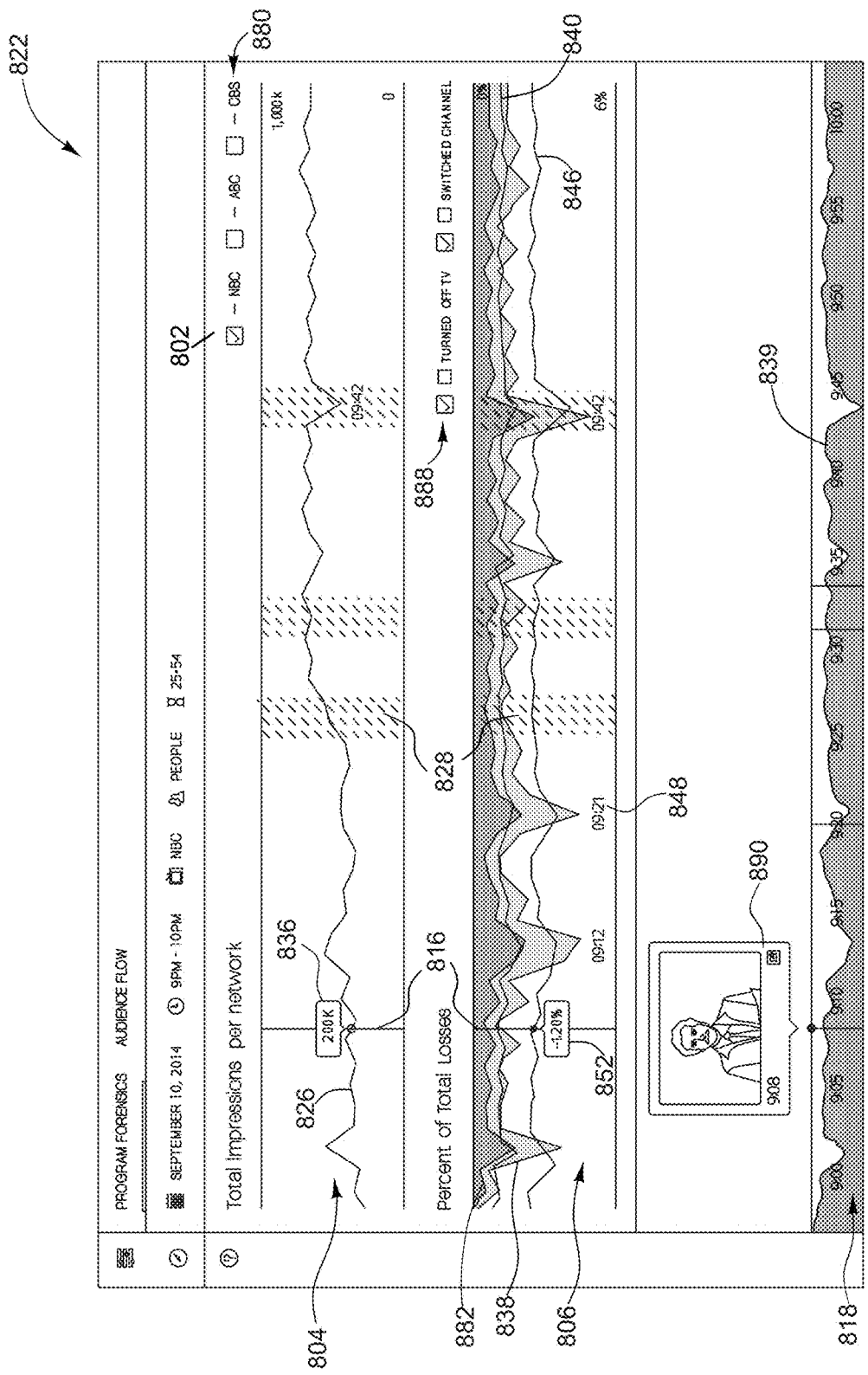
FIG. 8 illustrates example dynamic user-interactable graphical interfaces for providing a visualization of various elements of a show performance summary.

The visualization module 308 includes computer logic executable to provide for user interaction, receive user input, present information to the user via a display, such as the display 116, and send data to and receive data from the other entities of the system 300 via the network 302. In some implementations, the visualization module 308 may generate and present user interfaces, such as the user-interactable graphical interface 322 (e.g., as shown in FIGS. 2A-2F) and/or 822 (e.g., as shown in FIG. 8) based at least in part on information received from the server 336 via the network 302, as discussed further elsewhere herein.

In some implementations, the visualization module 308 includes a web browser and/or code operable therein, a customized native or client-side application (e.g., a dedicated mobile app) and/or code operating therein, a combination of the foregoing, etc.

The aggregation module 332 includes computer logic executable by the processor(s) 104 to aggregate measurement data 120, including, for example, audience and commercial occurrence data, from various information sources, such as computing devices and/or non-transitory storage media (e.g., databases, servers, etc.) configured to receive and satisfy data requests. The information sources from which the aggregation module 332 aggregates data, depicted in FIG. 3 as audience measurement systems 340a . . . 340n, may be associated with information measurement service providers (e.g., Nielsen™, Kantar™, Rentrak™, comScore™, Ooyala™ Brightcove™, etc.), channel/network/content providers (e.g., NBC™, ABC™, Discovery™, ESPN™, etc.), online video providers (e.g., Hulu™, YouTube™, etc.), and/or other content providers, online audio providers (e.g., Spotify™), etc.

The aggregation module 332 is coupled to the data store 108 to store, retrieve, and/or manipulate data stored therein and may be coupled to the traffic module 334, the server 336, the visualization module 308, and/or other components of the system 300 to exchange information therewith. For example, the aggregation module 332 may store, retrieve, and/or manipulate the measurement data 120 aggregated by it in the data store 108, and or may provide the data aggregated and/or processed by it to the traffic module 334 and/or the server 336 (e.g., preemptively or responsive to a function or procedure call, etc.).

The measurement data 120 may be stored in a data store 108 and include viewer-related information about shows accessible from any applicable viewing platform. A show means audio or audiovisual content viewable by a user. The show may be pre-recorded or live. The show may be professional or amateur in nature. In some implementations, the show may be broadcast OTA, via satellite, cable, radio, the Internet, during a particular time slot, may be broadcasted on demand, or recorded (e.g., on a digital video recorder), etc. Example platforms include but are not limited to online video (e.g., desktop, tablet, phone, set-top boxes, smart television, etc.), OTA, cable, satellite, etc., viewing platforms.

The measurement data may include network impressions and/or commercial occurrence data in some implementations. In addition to its plain and ordinary meaning, a network impression, or impression, means any instance of a user consuming a show (e.g., viewing, listening, playing back, streaming, etc., video data). In some instances, the number of impressions may correspond to the number of devices tuned to show. For example, a number of impressions may include a number of terminals (e.g., television sets) being tuned to a particular show at a particular time interval. In another example, an impression may be the number of clients streaming an online show (e.g., video data, audio data, etc.) playing at a particular time interval of that online show.

The term interval, in some contexts herein, refers to a discrete time increment over which data (e.g., a show performance summary) may be collected, analyzed, displayed, etc. In other contexts, the term interval also refers to a time period selected by a user in a user-interactable graphical interface (e.g., 322, 822, etc.). In regard to the latter definition, it should be understood that while the time period selected by a user may be the same as an increment over which data is collected, analyzed, and/or displayed, it may alternatively be a larger time period consisting of a plurality of such time increments. In some implementations, the time period reflected by the user selection may be set by user preference, interaction with the interface, or as a feature programmed into the visualization module 308.

The following table A collectively illustrates N rows of an example instance of measurement data 120 for the show NBC Nightly News that has been aggregated by the aggregation module 332 and processed, stored, formatted, and/or output by the traffic module 334. It should be understood that other variations, formats, data types, etc., of data are also possible and contemplated.

TABLE A

| Row # | Network | Date | Weekday | Time |
|---|---|---|---|---|
| 1 | NBC | Dec. 8, 2011 | Thu | 6:38 PM |
| 2 | NBC | Dec. 8, 2011 | Thu | 6:39 PM |
| 3 | NBC | Dec. 8, 2011 | Thu | 6:41 PM |
| 4 | NBC | Dec. 8, 2011 | Thu | 6:42 PM |
| 5 | NBC | Dec. 8, 2011 | Thu | 6:47 PM |
| 6 | NBC | Dec. 8, 2011 | Thu | 6:48 PM |
| 7 | NBC | Dec. 8, 2011 | Thu | 6:49 PM |
| 8 | NBC | Dec. 8, 2011 | Thu | 6:52 PM |
| ... | NBC | Dec. 8, 2011 | Thu | 6:55 PM |
| N | NBC | Dec. 8, 2011 | Thu | 6:57 PM |

| Row # | Program | MOP | Genre | Program Type |
|---|---|---|---|---|
| 1 (cont) | NBC NIGHTLY NEWS | 9 | News | NEWS |
| 2 (cont) | NBC NIGHTLY NEWS | 10 | News | NEWS |
| 3 (cont) | NBC NIGHTLY NEWS | 12 | News | NEWS |
| 4 (cont) | NBC NIGHTLY NEWS | 13 | News | NEWS |
| 5 (cont) | NBC NIGHTLY NEWS | 18 | News | NEWS |
| 6 (cont) | NBC NIGHTLY NEWS | 19 | News | NEWS |
| 7 (cont) | NBC NIGHTLY NEWS | 20 | News | NEWS |
| 8 (cont) | NBC NIGHTLY NEWS | 23 | News | NEWS |
| ... (cont) | NBC NIGHTLY NEWS | 26 | News | NEWS |
| N (cont) | NBC NIGHTLY NEWS | 28 | News | NEWS |

| Row # | Program Subtype | Trackage | Episode | Telecast Time |
|---|---|---|---|---|
| 1 (cont) | NEWS | | | 06:30 PM-06:59 PM |
| 2 (cont) | NEWS | | | 06:30 PM-06:59 PM |
| 3 (cont) | NEWS | | | 06:30 PM-06:59 PM |
| 4 (cont) | NEWS | | | 06:30 PM-06:59 PM |
| 5 (cont) | NEWS | | | 06:30 PM-06:59 PM |
| 6 (cont) | NEWS | | | 06:30 PM-06:59 PM |
| 7 (cont) | NEWS | | | 06:30 PM-06:59 PM |
| 8 (cont) | NEWS | | | 06:30 PM-06:59 PM |
| ... (cont) | NEWS | | | 06:30 PM-06:59 PM |
| N (cont) | NEWS | | | 06:30 PM-06:59 PM |

TABLE A-continued

| Row # | Telecast Duration | Average Audience | Average Audience (% change) | Rating |
|---|---|---|---|---|
| 1 (cont) | 30 | 1264298 | 0.015 | 2.078415419 |
| 2 (cont) | 30 | 1275234 | 0.0086 | 2.09639342 |
| 3 (cont) | 30 | 1227583 | −0.0096 | 2.018058587 |
| 4 (cont) | 30 | 1244953 | 0.0141 | 2.046613623 |
| 5 (cont) | 30 | 1258190 | 0.0394 | 2.068374304 |
| 6 (cont) | 30 | 1233574 | −0.0196 | 2.027907362 |
| 7 (cont) | 30 | 1239179 | 0.0045 | 2.037121581 |
| 8 (cont) | 30 | 1248288 | 0.0249 | 2.052096125 |
| ... (cont) | 30 | 1243109 | 0.0098 | 2.043582219 |
| N (cont) | 30 | 1229871 | 0.0158 | 2.021819895 |

| Row # | Commercial Time (sec) | Promo Time (sec) | PSA Time (sec) | Non-program Total Time (sec) |
|---|---|---|---|---|
| 1 (cont) | | | | |
| 2 (cont) | | | | |
| 3 (cont) | | | | |
| 4 (cont) | 43 | | | 43 |
| 5 (cont) | | | | |
| 6 (cont) | 52 | | | 52 |
| 7 (cont) | 60 | | | 60 |
| 8 (cont) | | | | |
| ... (cont) | 60 | | | 60 |
| N (cont) | | | | |

| Row # | Reach | Reach (% change) | In Flow - Tune | In Flow - Tune (%) |
|---|---|---|---|---|
| 1 (cont) | 1216095 | 0.0156 | 28126 | 0.0231 |
| 2 (cont) | 1227031 | 0.009 | 7939 | 0.0065 |
| 3 (cont) | 1194223 | −0.0099 | 24748 | 0.0207 |
| 4 (cont) | 1211593 | 0.0145 | 26137 | 0.0216 |
| 5 (cont) | 1224830 | 0.0405 | 55587 | 0.0454 |
| 6 (cont) | 1200214 | −0.0201 | 21805 | 0.0182 |
| 7 (cont) | 1205819 | 0.0047 | 31941 | 0.0265 |
| 8 (cont) | 1214928 | 0.0256 | 27072 | 0.0223 |
| ... (cont) | 1209749 | 0.01 | 24657 | 0.0204 |
| N (cont) | 1196511 | 0.0163 | 41196 | 0.0344 |

| Row # | In Flow - Lead | In Flow - Lead (%) | In Flow - Switch | In Flow - Switch (%) |
|---|---|---|---|---|
| 1 (cont) | 1179714 | 0.9701 | 8255 | 0.0068 |
| 2 (cont) | 1203286 | 0.9806 | 15806 | 0.0129 |
| 3 (cont) | 1169475 | 0.9793 | 0 | 0 |
| 4 (cont) | 1169238 | 0.965 | 16218 | 0.0134 |
| 5 (cont) | 1154318 | 0.9424 | 14925 | 0.0122 |
| 6 (cont) | 1150603 | 0.9587 | 27806 | 0.0232 |
| 7 (cont) | 1170229 | 0.9705 | 3649 | 0.003 |
| 8 (cont) | 1169917 | 0.963 | 17939 | 0.0148 |
| ... (cont) | 1185092 | 0.9796 | 0 | 0 |
| N (cont) | 1152957 | 0.9636 | 2358 | 0.002 |

| Row # | Switch In - 1 Network | Switch In - 1 Reach | Switch In - 1 Reach (%) | Switch In - 2 Network |
|---|---|---|---|---|
| 1 (cont) | UNIVISION | 6555 | 0.0054 | NFL NETWORK |
| 2 (cont) | CBS | 14115 | 0.0115 | ABC |
| 3 (cont) | | 0 | 0 | |
| 4 (cont) | BET | 11902 | 0.0098 | HBO PRIME |
| 5 (cont) | BET | 11902 | 0.0097 | FOOD |
| 6 (cont) | GOLF | 15349 | 0.0128 | CBS |
| 7 (cont) | ABC | 3649 | 0.003 | |
| 8 (cont) | COMEDY CENTRAL | 4586 | 0.0038 | CBS |
| ... (cont) | | 0 | 0 | |
| N (cont) | SCIENCE | 2358 | 0.002 | |

TABLE A-continued

| Row # | Switch In - 2 Reach | Switch In - 2 Reach (%) | Switch In - 3 Network | Switch In - 3 Reach |
|---|---|---|---|---|
| 1 (cont) | 1700 | 0.0014 | | 0 |
| 2 (cont) | 1691 | 0.0014 | | 0 |
| 3 (cont) | 0 | 0 | | 0 |
| 4 (cont) | 2251 | 0.0019 | MTV | 2065 |
| 5 (cont) | 3023 | 0.0025 | | 0 |
| 6 (cont) | 7241 | 0.006 | ABC FAMILY | 3065 |
| 7 (cont) | 0 | 0 | | 0 |
| 8 (cont) | 3909 | 0.0032 | SPROUT | 3688 |
| . . . (cont) | 0 | 0 | | 0 |
| N (cont) | 0 | 0 | | 0 |

| Row # | Switch In - 3 Reach (%) | Switch In - 4 Network | Switch In - 4 Reach | Switch In - 4 Reach (%) |
|---|---|---|---|---|
| 1 (cont) | 0 | | 0 | 0 |
| 2 (cont) | 0 | | 0 | 0 |
| 3 (cont) | 0 | | 0 | 0 |
| 4 (cont) | 0.0017 | | 0 | 0 |
| 5 (cont) | 0 | | 0 | 0 |
| 6 (cont) | 0.0026 | LMN | 2151 | 0.0018 |
| 7 (cont) | 0 | | 0 | 0 |
| 8 (cont) | 0.003 | TBS | 3398 | 0.0028 |
| . . . (cont) | 0 | | 0 | 0 |
| N (cont) | 0 | | 0 | 0 |

| Row # | Switch In - 5 Network | Switch In - 5 Reach | Switch In - 5 Reach (%) | Switch In - Other Networks |
|---|---|---|---|---|
| 1 (cont) | | 0 | 0 | Other |
| 2 (cont) | | 0 | 0 | Other |
| 3 (cont) | | 0 | 0 | Other |
| 4 (cont) | | 0 | 0 | Other |
| 5 (cont) | | 0 | 0 | Other |
| 6 (cont) | | 0 | 0 | Other |
| 7 (cont) | | 0 | 0 | Other |
| 8 (cont) | NAT GEO | 2358 | 0.0019 | Other |
| . . . (cont) | | 0 | 0 | Other |
| N (cont) | | 0 | 0 | Other |

| Row # | Switch In - Other Reach | Switch In - Other Reach (%) | Out Flow - Tune | Out Flow - Tune (%) |
|---|---|---|---|---|
| 1 (cont) | 0 | 0 | 4437 | 0.0036 |
| 2 (cont) | 6.66E−13 | 5.43E−21 | 60489 | 0.0493 |
| 3 (cont) | 0 | 0 | 20664 | 0.0173 |
| 4 (cont) | 8.88E−13 | 7.33E−21 | 32407 | 0.0267 |
| 5 (cont) | 0 | 0 | 28674 | 0.0234 |
| 6 (cont) | 1.33E−12 | 1.11E−20 | 24917 | 0.0208 |
| 7 (cont) | 0 | 0 | 35866 | 0.0297 |
| 8 (cont) | 0 | 0 | 16624 | 0.0137 |
| . . . (cont) | 0 | 0 | 36212 | 0.0299 |
| N (cont) | 0 | 0 | 8249 | 0.0069 |

| Row # | Out Flow - Lead | Out Flow - Lead (%) | Out Flow - Switch | Out Flow - Switch (%) |
|---|---|---|---|---|
| 1 (cont) | 1203286 | 0.9895 | 8372 | 0.0069 |
| 2 (cont) | 1164350 | 0.9489 | 2192 | 0.0018 |
| 3 (cont) | 1169238 | 0.9791 | 4321 | 0.0036 |
| 4 (cont) | 1133650 | 0.9357 | 45536 | 0.0376 |
| 5 (cont) | 1150603 | 0.9394 | 45553 | 0.0372 |
| 6 (cont) | 1170229 | 0.975 | 5068 | 0.0042 |
| 7 (cont) | 1165367 | 0.9665 | 4586 | 0.0038 |
| 8 (cont) | 1198304 | 0.9863 | 0 | 0 |
| . . . (cont) | 1173537 | 0.9701 | 0 | 0 |
| N (cont) | 1188262 | 0.9931 | 0 | 0 |

| Row # | Switch Out - 1 Network | Switch Out - 1 Reach | Switch Out - 1 Reach (%) | Switch Out - 2 Network |
|---|---|---|---|---|
| 1 (cont) | TBS | 3398 | 0.0028 | E! |
| 2 (cont) | ESPN | 2192 | 0.0018 | |
| 3 (cont) | HGTV | 4321 | 0.0036 | |
| 4 (cont) | ABC | 17661 | 0.0146 | CBS |
| 5 (cont) | ABC | 26188 | 0.0214 | ESPNEWS |
| 6 (cont) | HISTORY | 2710 | 0.0023 | SCIENCE |
| 7 (cont) | COMEDY CENTRAL | 4586 | 0.0038 | |
| 8 (cont) | | 0 | 0 | |
| . . . (cont) | | 0 | 0 | |
| N (cont) | | 0 | 0 | |

| Row # | Switch Out - 2 Reach | Switch Out - 2 Reach (%) | Switch Out - 3 Network | Switch Out - 3 Reach |
|---|---|---|---|---|
| 1 (cont) | 2823 | 0.0023 | LMN | 2151 |
| 2 (cont) | 0 | 0 | | 0 |
| 3 (cont) | 0 | 0 | | 0 |
| 4 (cont) | 15973 | 0.0132 | BET | 11902 |
| 5 (cont) | 10922 | 0.0089 | TBS | 3398 |
| 6 (cont) | 2358 | 0.002 | | 0 |
| 7 (cont) | 0 | 0 | | 0 |
| 8 (cont) | 0 | 0 | | 0 |
| . . . (cont) | 0 | 0 | | 0 |
| N (cont) | 0 | 0 | | 0 |

| Row # | Switch Out - 3 Reach (%) | Switch Out - 4 Network | Switch Out - 4 Reach | Switch Out - 4 Reach (%) |
|---|---|---|---|---|
| 1 (cont) | 0.0018 | | 0 | 0 |
| 2 (cont) | 0 | | 0 | 0 |
| 3 (cont) | 0 | | 0 | 0 |
| 4 (cont) | 0.0098 | | 0 | 0 |
| 5 (cont) | 0.0028 | FOOD | 3023 | 0.0025 |
| 6 (cont) | 0 | | 0 | 0 |
| 7 (cont) | 0 | | 0 | 0 |
| 8 (cont) | 0 | | 0 | 0 |
| . . . (cont) | 0 | | 0 | 0 |
| N (cont) | 0 | | 0 | 0 |

| Row # | Switch Out - 5 Network | Switch Out - 5 Reach | Switch Out - 5 Reach (%) | Switch Out - Other Networks |
|---|---|---|---|---|
| 1 (cont) | | 0 | 0 | Other |
| 2 (cont) | | 0 | 0 | Other |
| 3 (cont) | | 0 | 0 | Other |
| 4 (cont) | | 0 | 0 | Other |
| 5 (cont) | GSN | 2022 | 0.0017 | Other |
| 6 (cont) | | 0 | 0 | Other |
| 7 (cont) | | 0 | 0 | Other |
| 8 (cont) | | 0 | 0 | Other |
| . . . (cont) | | 0 | 0 | Other |
| N (cont) | | 0 | 0 | Other |

| Row # | Switch Out - Other Reach | Switch Out - Other Reach (%) | Program_New | Demo |
|---|---|---|---|---|
| 1 (cont) | 4.44E−13 | 3.65E−21 | Nightly News M-F | F25-54 |
| 2 (cont) | 0 | 0 | Nightly News M-F | F25-54 |
| 3 (cont) | 0 | 0 | Nightly News M-F | F25-54 |
| 4 (cont) | 0 | 0 | Nightly News M-F | F25-54 |
| 5 (cont) | 1.78E−12 | 1.45E−20 | Nightly News M-F | F25-54 |
| 6 (cont) | 0 | 0 | Nightly News M-F | F25-54 |
| 7 (cont) | 0 | 0 | Nightly News M-F | F25-54 |
| 8 (cont) | 0 | 0 | Nightly News M-F | F25-54 |
| . . . (cont) | 0 | 0 | Nightly News M-F | F25-54 |
| N (cont) | 0 | 0 | Nightly News M-F | F25-54 |

TABLE A-continued

| Row # | Retitle | Special | Sustaining |
|---|---|---|---|
| 1 (cont) | 0 | 0 | 0 |
| 2 (cont) | 0 | 0 | 0 |
| 3 (cont) | 0 | 0 | 0 |
| 4 (cont) | 0 | 0 | 0 |
| 5 (cont) | 0 | 0 | 0 |

For instance, it should be understood that data associated with shows with different dates and times could be used, shows that air in different time slots and/or in the same timeslots may be included, shows streamed via the Internet may be included, and/or that other variations, formats, data types, etc., of data are also possible. For instance, any of the type of data from Table A may be included, depending on the data being visualized (such as that depicted in FIGS. 2A-2F and 8).

TABLE B

| Row | network | date | program | time | mop | reach |
|---|---|---|---|---|---|---|
| 1 | CBS | Jan. 24, 2014 | CBS EVENING NEWS | 6:34 PM | 5 | 1146072 |
| 2 | ABC | Aug. 19, 2012 | THIS WEEK | 10:35 AM | 36 | 204147 |
| 3 | CBS | Apr. 1, 2012 | FACE THE NATION | 10:30 AM | 1 | 1217754 |
| 4 | NBC | Nov. 2, 2011 | TONIGHT SHOW | 12:04 AM | 5 | 1019451 |
| 5 | CBS | Jun. 17, 2013 | CBS THIS MORNING-SUS | 8:45 AM | 81 | 1932082 |
| 6 | ABC | Jul. 17, 2014 | GOOD MORNING AMERICA | 7:27 AM | 28 | 773292 |
| 7 | CBS | Mar. 28, 2012 | CBS THIS MORNING-2 | 8:16 AM | 52 | 458059 |
| 8 | NBC | Aug. 16, 2013 | TODAY SHOW III | 10:32 AM | 33 | 458575 |
| ... | NBC | Nov. 10, 2011 | NBC NIGHTLY NEWS | 6:46 PM | 17 | 1199335 |
| n | NBC | Jan. 10, 2012 | TODAY SHOW III | 10:37 AM | 38 | 805361 |

| Row | commercial time (sec) | Outflow total | Outflow total pct | demo | Outflow mean | Outflows d1 low |
|---|---|---|---|---|---|---|
| 1 (cont) |  | 12147 | 0.005662457 | P18-49 | 0.014647 | 0.003356779 |
| 2 (cont) |  | 0 | 0 | M18-49 | 0.010844993 | −0.000762766 |
| 3 (cont) |  | 87002 | 0.054447781 | P25-54 | 0.071940745 | 0.041541083 |
| 4 (cont) |  | 39113 | 0.014717974 | P18-49 | 0.016221857 | 0.00267859 |
| 5 (cont) |  | 56525 | 0.006745419 | P2 | 0.008068478 | 0.002154121 |
| 6 (cont) |  | 2052 | 0.000857852 | F18-49 | 0.007278906 | 0.002241878 |
| 7 (cont) | 60 | 27901 | 0.01651494 | F25-54 | 0.00723593 | −8.06228E−05 |
| 8 (cont) |  | 9362 | 0.007331325 | P18-49 | 0.008661642 | −0.000713091 |
| ... (cont) | 4 | 22325 | 0.010222672 | F25-54 | 0.011335007 | 0.002530907 |
| n (cont) | 60 | 53568 | 0.026755278 | P25-54 | 0.007763335 | −0.000839376 |

| Row | Outflows d1 high | Outflows d2 low | Outflows d2 high |
|---|---|---|---|
| 1 (cont) | 0.025937221 | 0 | 0.037227443 |
| 2 (cont) | 0.022452752 | 0 | 0.03406051 |
| 3 (cont) | 0.102340407 | 0.011141421 | 0.132740069 |
| 4 (cont) | 0.029765124 | 0 | 0.04330839 |
| 5 (cont) | 0.013982836 | 0 | 0.019897193 |
| 6 (cont) | 0.012315933 | 0 | 0.01735296 |
| 7 (cont) | 0.014552483 | 0 | 0.021869035 |
| 8 (cont) | 0.018036374 | 0 | 0.027411107 |
| ... (cont) | 0.020139107 | 0 | 0.028943206 |
| n (cont) | 0.016366046 | 0 | 0.024968757 |

TABLE A-continued

| 6 (cont) | 0 | 0 | 0 |
|---|---|---|---|
| 7 (cont) | 0 | 0 | 0 |
| 8 (cont) | 0 | 0 | 0 |
| ... (cont) | 0 | 0 | 0 |
| N (cont) | 0 | 0 | 0 |

The following table B collectively illustrates N rows of another example instance of example measurement data 120 that has been aggregated by the aggregation module 332 and processed, stored, formatted, and/or output by the traffic module 334, although other and/or different data may additionally and/or alternatively be included in table A and/or B.

The traffic module 334 includes computer logic executable by the processor(s) 104 to process the measurement data, and generate, store, and/or provide performance summaries including show traffic statistics. A show performance summary (also referred to herein simply as performance summary) means data reflecting the performance of a show, such as the number of impressions by viewers, viewer traffic inbound to the show, viewer traffic outbound from the show, commercial occurrence data, ratings, viewer demographic data, show details (type, timing, duration, genre, network, subject matter, etc.), and so forth. While the users of the platform are described as viewers in some contexts, it should be understood that the term viewer includes any type of audience member, such as a viewer, a listener, etc. In some implementations, a show performance summary may reflect the show specifically and/or, in some cases, the timeslot associated with the show.

By way of example and not limitation, the traffic module 334 may program the processor(s) 104 to perform one or more of the following operations: generate and/or format a show performance summary; generate a comparison of viewer traffic between the selected show or timeslot and competing shows and/or timeslots over duration of a selected show or timeslot; calculate a percentage of total viewer loss at certain time intervals over duration of a selected show and/or timeslot; determine a total number of viewers for each time interval over duration of a selected show and/or timeslot; determine a viewer gain percentage of each inbound source at each time interval over a duration of a selected show and/or timeslot; determine a viewer loss percentage of each outbound source at each time interval over a duration of a selected show and/or timeslot; and for a selected show and/or timeslot, rank inbound sources based on respective viewer gains and outbound sources based on respective viewer losses.

In some implementations, the traffic module 334, when executed, may determine analysis information based on a variety of factors in order to ascertain the reasons why a certain data metric, such as the current loss rate, differs from historical and/or average values of that data metric. For example, in some instances, the traffic module 334 may determine that the loss rate at a particular time interval exceeded two standard deviations. The traffic module 334 may then evaluate which of the factors (e.g., as shown in one or both of the tables above) differ from their historical and/or average values beyond a pre-determined dynamic or static threshold. For example, the traffic module 334 may determine that at a time interval a large quantity of viewers left the first show and that at that moment the President's State of the Union was being broadcast on a different television network. Upon identifying one or more factors for a given data point, the traffic module 334 may include data describing the factor(s) in the show performance summary, and the visualization module 308 (e.g., the loss chart module 318) may present a graphical interface element (e.g., a visual indicator or overlay associated with the data point) that textually and/or graphically describes the factor(s) attributing to the variance in data from a normal or average threshold. It should be understood that this analysis information and process is provided as an example and that other methods and information are possible and contemplated herein.

The traffic module 334 is coupled to the data store 108 to store, retrieve, and/or manipulate data stored therein and may be coupled to the aggregation module 332, the server 336, the visualization module 308, and/or other components of the system 300 to exchange information therewith. For example, the traffic module 334 may store, retrieve, and/or manipulate the aggregated measurement data 120, the performance summaries, and/or any other suitable data in the data store 108, and or may provide any of the foregoing data to the server 336 (e.g., preemptively, responsive to a procedure call, etc.) and/or any other component of the system 300.

The server 336 includes computer logic executable by the processor(s) 104 to receive, process, and/or respond to content requests. The server 336 may include an HTTP(S) server, a REST (representational state transfer) service, or other suitable server type. The server 336 may receive content requests (e.g., product search requests, HTTP(S) requests) from client devices 306, cooperate with the traffic module 334 and/or the aggregation module 332 to determine the content, retrieve and incorporate data from the data store 108, format the content, and provide the content to the client devices 306. A non-limiting example of the content provided by the server 336 includes performance summaries, as discussed elsewhere herein.

In some instances, the server 336 may format the content (e.g., a performance summary) using a certain format and provide the content to a corresponding visualization module 308 for processing and/or rendering to the user for display. For instance, the content may include structured data and the server 336 may format it using XML, JSON, etc., although other suitable data formats are also contemplated. The visualization module 308 may generate graphical data based on the structured data, as discussed elsewhere herein.

In further examples, the content generated by the server 336 may include other markup (e.g., HTML, etc.), style sheets (e.g., CSS, XSL, etc.), graphics, and/or scripts (e.g., JavaScript, ActionScript, etc.), and the client device 306 may interpret the content and render an interactive Web User Interface (WUI) (e.g., in some instances, the dynamic user-interactable graphical interface 322) for display on the display 116, although it should be understood that other suitable formats and/or configurations are also possible and contemplated. Using the user interfaces presented by the client device 306, a user can input commands selecting various user actions. For example, using these interfaces users can manipulate interactive graphical elements, such as the elements of the dynamic user-interactable graphical interfaces discussed elsewhere herein, drill-down on various aspects of the displayed visuals and data, access further content (e.g., corresponding webpages and/or other content, such as local and online files, etc.).

The server 336 may be coupled to the data store 108 to store retrieve, and/or manipulate data stored therein and may be coupled to the traffic module 334 and/or the aggregation module 332 to facilitate its operations. In some implementations, the server 336 may allow a user on a client device 306 to more directly access various functions of the traffic module 334 and/or the aggregation module 332 using application interfaces thereof.

As depicted in FIG. 1, the computing system 100 may include a communication unit 102, processor(s) 104, memory(ies) 106, a data store 108, input device(s) 114, and/or a display 116 which may be communicatively coupled by a communication bus 110. The computing system 100 depicted in FIG. 1 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 100 may include various operating systems, sensors, additional processors, and other physical configurations.

The components 308, 332, 334, and/or 336, and/or components thereof (e.g., 310, 312, 314, 316, and/or 318, as shown in FIG. 3), may be communicatively coupled by the bus 110 and/or the processor(s) 104 to one another and/or the other components of the computing system 100. In some implementations, the components 308, 332, 334, and/or 336 may include computer logic storable in the memory(ies) 106 and executable by the processor(s) 104, and/or implemented in hardware (e.g., ASIC, FPGA, ASSP, SoC, etc.), to provide their acts and/or functionality. In any of the foregoing implementations, these components 308, 332, 334, and/or 336 may be adapted for cooperation and communication with the processor(s) 104 and the other components of the computing system 100.

The processor(s) 104 may execute software instructions by performing various input, logical, and/or mathematical operations. The processor(s) 104 may be physical and/or virtual, and may include a single core or plurality of processing units and/or cores. In some implementations, the processor(s) 104 may be capable of generating and providing electronic display signals to a display device, supporting the display of images, capturing and transmitting images, performing complex tasks, etc. In some implementations, the processor(s) 104 may be coupled to the memory(ies) 106 via the bus 110 to access data and instructions therefrom and store data therein. The bus 110 may couple the processor(s) 104 to the other components of the computing system 100 including, for example, the memory(ies) 106, the communication unit 102, the input device(s) 114, the display 116, and the data store 108.

The memory(ies) 106 may store and provide access to data to the other components of the computing system 100. The memory(ies) 106 may be included in a single computing device or a plurality of computing devices. In some implementations, the memory(ies) 106 may store instructions and/or data that may be executed by the processor(s) 104. For example, the memory(ies) 106 may store one or more of the aggregation module 332, the server 336, the traffic module 334, the visualization module 308, and/or their respective components, depending on the configuration. The memory(ies) 106 are also capable of storing other instructions and data, including, for example, an operating system, hardware drivers, other software applications, databases, etc. The memory(ies) 106 may be coupled to the bus 110 for communication with the processor(s) 104 and the other components of computing system 100.

The memory(ies) 106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 104. In some implementations, the memory(ies) 106 may include one or more of volatile memory and non-volatile memory (e.g., RAM, ROM, hard disk, optical disk, etc.). It should be understood that the memory(ies) 106 may be a single device or may include multiple types of devices and configurations.

The bus 110 can include a communication bus for transferring data between components of a computing device or between computing devices, a network bus system including the network 302 or portions thereof, a processor mesh, a combination thereof, etc. In some implementations, the aggregation module 332, traffic module 334, server 336, visualization module 308, and/or various other components operating on the computing system 100 (operating systems, device drivers, etc.) may cooperate and communicate via a communication mechanism included in or implemented in association with the bus 110. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 102 may include one or more interface devices (I/F) for wired and wireless connectivity among the components of the system 300. For instance, the communication unit 102 may include, but is not limited to, various types of known connectivity and interface options. The communication unit 102 may be coupled to the other components of the computing system 100 via the bus 110. The communication unit 102 may be electronically coupled to the network 302. In some implementations, the communication unit 102 can link the processor(s) 104 to the network 302, which may in turn be coupled to other processing systems. The communication unit 102 can provide other connections to the network 302 and to other entities of the system 300 using various standard communication protocols.

The input device(s) 114 may include any device for inputting information into the computing system 100. In some implementations, the input device(s) 114 may include one or more peripheral devices. For example, the input device(s) 114 may include a keyboard, a pointing device, microphone, an image/video capture device (e.g., camera), a touch-screen display integrated with the display 116, etc.

The display 116 may be any device capable of outputting information from the computing system 100. The display 116 may include one or more of a display (LCD, OLED, etc.), touch-screen display, a haptic device, audio reproduction device, a printer, a 3D printer, etc. In some implementations, the display 116 is a display that may display electronic images and data output by the computing system 100 for presentation to a user 106. In some implementations, the computing system 100 may include a graphics adapter (not shown) for rendering and outputting the images and data for presentation on display 116. The graphics adapter (not shown) may be a separate processing device including a separate processor and memory (not shown) or may be integrated with the processor(s) 104 and the memory(ies) 106.

The data store 108 is an information source for storing and providing access to data. The data stored by the data store 108 may be organized and queried using various criteria including any type of data stored by them, such as a show identifier, customer identifier, IP address, demographics data, time and/or date, content provider, etc. The data store 108 may include data tables, databases, or other organized collections of data. Examples of the types of data stored by the data store 108 may include, but are not limited to, measurement data 120, user data 126, etc., as discussed elsewhere herein.

The data store 108 may be included in the computing system 100 or in another computing system and/or storage system distinct from but coupled to or accessible by the computing system 100. The data store 108 can include one or more non-transitory computer-readable media for storing the data. In some implementations, the data store 108 may be incorporated with the memory(ies) 106 or may be distinct therefrom.

In some implementations, the data store 108 may store data associated with a database management system (DBMS) operable on the computing system 100. For example, the DBMS could include a structured query language (SQL) DBMS, a NoSQL DMBS, a file system, flat files, various combinations thereof, etc. In some instances, the DBMS may store data in multi-dimensional tables comprised of rows and columns, and manipulate, e.g., insert, query, update and/or delete, rows of data using programmatic operations.

The user data 126 may include profiles for each of the users of the system 300, such as content providers and/or other stakeholders of the shows. The user data 126 may be correlated with the other types of data in the data store 108, for example 120. A given user's profile may include the user's user account and attributes describing the user. The user account may include information associated with the user's identity on the services provided by the system 300, such as a username, password, preference data, employer information, payment information, etc. The attributes may characterize the user's preferences and/or identity.

In some implementations, the user data 126 may include data defining user access to services of the analytics server 330, visualization module 308, etc. In some instances, the user data 126 may define permissions, preferences, browsing data, user storable information, and so forth. For example, a specific user may be permitted to log into that user's account and view only that information pertaining to that user (e.g., as it relates to the user's job or role); such as show performance summary and/or analytics configured for/by that user and/or reflecting the performance of the show(s) and/or network(s) with which that user is associated.

FIGS. 2A-2F illustrate a dynamic user-interactable graphical interface 322 generated using a show performance summary. The dynamic user-interactable graphical interface 322 provides a visual comparison of viewer traffic between a target (e.g., first show) and one or more competing shows and/or networks. More particularly, in the depicted example, the interface 322*a* displays performance data for a first show (e.g., the Today Show) and one or more competing shows over the certain timeframe (e.g., 7-9 AM) across discrete time intervals.

The interface 322 includes a number of static and dynamic elements configured to efficiently present, compare, and allow interaction with information from a show performance summary. As shown, the interface 322 may include a first show identifier 202, a traffic chart 204, a traffic loss chart 206, a graphical traffic meter 208, a source comparison chart 260, an applicable time region 214, a slider 216 including a handle 220, a time range region 218, and a time selector 222, as well as various other data display, filtering, and interaction tools. The different states of the interface 322 depicted in FIGS. 2A-2F are respectively labeled 322*a* . . . 322*f*.

In the interface 322, the traffic chart 204, the traffic loss chart 206, the graphical traffic meter 208, the source comparison chart 260 (and/or other content regions) are dynamically interconnected by the visualization module 308 and configured by it to be synchronously updated based on user interaction with the interface 322 and/or data being received. For instance, input received from an input device 114 causes the visualization module 308 to synchronously update all applicable elements of the interface 322 to reflect the statistics that correspond to that input.

In some implementations, a user can interact with the interface 322 using a draggable user interface element that is used to select a discrete time interval within the interface 322, such as the slider 216. In an example, by dragging the slider 216 through a range of times 218, a user may select a discrete time interval, which in turn causes the visualization module 308 to synchronously update applicable graphical and/or textual data displayed by the different content regions of the interface 322, such as 202, 204, 206, 208, and/or 260. For example, the show performance summary may include various data, such as the reach, outflow, average audience, etc., statistics (e.g., see Tables A and B), as described elsewhere herein.

In the depicted implementation, the slider 216 includes a virtual handle 220 that may be used by the user to select and drag the slider 216. For example, the virtual handle 220 may be draggable within the dynamic user-interactable graphical interface 322 by the user to isolate the viewer traffic associated with a certain discrete time interval from among the discrete time intervals of the viewer traffic. More particularly, a user may, using an input device 114, select the discrete time interval by dragging the handle 220 to a certain position within the traffic loss chart 206, making a selection (e.g., clicking, tapping, etc.) at a certain location within the traffic chart 204 or the traffic loss chart 206, by interacting with the applicable time display 214, or performing other suitable actions.

Other time selections mechanisms are also possible and contemplated. For instance, the selected time interval may be indicated textually and/or graphically, may be selected using a drop-down menu, a dynamic slider that automatically follows the user's pointer device, point sensitive content regions (e.g., 204, and 206) and can be clicked or tapped using the input device 114 to automatically set the discrete time interval, by selecting a time depicted in the time range region 218, a voice command indicates the interval, a hand gesture captured by a camera of the user's computer and processed by the visualization module 308, etc. In further implementations, instead of selecting a specific point in time, the slider 216 and/or handle 220 could be configured to select a time segment (time subrange), (e.g., over which values may be summed or averaged).

In the depicted implementation, the time range region 218 reflects the time range of the performance data being displayed in the interface and the current time selector 222 is a user interface element selectable by the user to scroll through/select the data to display in the content regions 204, 206, 208, 260, and/or 218.

The user may interact with the time range region 218 using the input device 114 to select (e.g., by dragging the times, scrolling, pinching, entering a value or range of values, entering a time range or interval resolution, etc.) the time range to display on the interface 322 (e.g., limit the displayed data to). In some implementations, the interface 322 may additionally or alternatively include the current time selector 222, which, when selected by a user, updates the range of times depicted in 218 as well as the corresponding data in the other elements 202, 204, 206, 208, and/or 260 of the interface 322. The current time selector 222 allows the user to scroll back in time to view earlier performance data as well as scroll to the current time to expose a "live" (e.g., realtime/near realtime) view.

For instance, in these or other implementations, the visualization module 308 may automatically scroll or refresh the content region, based on real-time performance data being automatically received for the shows (e.g., streamed to) by the visualization module 308, to automatically reflect the most current statistics. Additionally, although FIGS. 2A-2F illustrate synchronous updating of various elements of the interface 322 based on the selection of a time interval, synchronous updating may also be performed based on the various other filter and input selections, as described elsewhere herein.

The traffic chart 204 displays a total number of impressions over a range of discrete time intervals. As shown in FIG. 2B, the traffic chart 204 includes a traffic chart legend 224 and a chart region 225. The traffic chart legend 224 includes indicators for a first show 230, one or more competing shows 232*a* . . . 232*n*, and commercials 234, although other configurations are possible. The chart region 225 includes visual representations of traffic rates 226*a* . . . 226*n*. The traffic rates 226*a* . . . 226*n* correspond to the first show 230 and competing show(s) 232*a* . . . 232*n*, and may be visually differentiated using different, visually distinguishable graphing elements (e.g., line types, colors, etc.).

The commercial indicator 234 indicates the occurrence of commercials over the depicted time frame. The commercial indicator 234 is linked to the commercial overlays 228 in the chart region 225. The commercial overlays 228 correspond to commercial occurrence data and are overlaid with visual representations of traffic rates 226*a* . . . 226*n*. The commercial overlays 228 may be interactable and upon being interacted with (e.g., selected), the traffic chart module 312 may display a region including content describing that particular commercial occurrence (e.g., identity, duration, sponsor, an audio or audiovisual preview of the commercial via an embedded player (e.g., see FIG. 8), etc., associated with the commercial). The user may also toggle the commercial overlays 228 on and off by selecting the commercial indicator 234.

The traffic rates 226*a* . . . 226*n* reflect the total number of impressions for the corresponding shows. As shown in the figures, each traffic rate may be displayed in a graphical format (e.g., in a bar, pie, line, bubble, or other chart) where traffic rates for a first show and competing shows are visually compared. The visual depiction of the various traffic rates may be linked to the indication of that particular show (e.g., 230 or 232*a* . . . 232*n*) in the traffic chart legend 224. For example, the traffic rate 226*b* may be linked to show indicator 230, which may be selected by the user to change which show is displayed, highlight show specific data, and/or dynamically update various corresponding elements 202, 204, 206, 208, and 260 to reflect data pertaining to that specific show. For example, hovering over the show indicator 230 may instantly highlight the traffic rate 226*b* and/or update one or more other elements of the interface 322 to reflect data for that specific show (e.g., toggling the show corresponding to the show indicator 230 to be the first show, as discussed elsewhere herein according to some implementations).

In some implementations, the traffic chart module 312 generates/updates the traffic chart 204 in response to a signal from the interface module 316, which indicates the range of times (e.g., as selected in the time range region 218) and the selected time interval (e.g., corresponding to the position of the slider 216 along the time range region 218). The traffic chart module 312 accesses the performance summary data for each of the first show and the one or more selected shows and generates the visual representations of the traffic rates 226*a* . . . 226*n* and an impressions metric 236 using the performance summary as indexed by time intervals. For example, the data in Table A illustrates a specific program (NBC Nightly News) and statistics about the specific program including the average audience indexed over a range of time intervals, which is input into the traffic chart module 312 to generate the elements of the traffic chart 204.

Similarly, depending on the configuration, the traffic chart module 312 or the interface module 316 may access the commercial occurrence data indexed by time interval in the show performance summary (e.g., as indicated in the columns labeled commercial time, promo time, non-program time, etc., in Table A). For example, the traffic chart module 312 may process the commercial occurrence data from the show performance summary and generate graphical overlays and overlay them in the traffic chart 204 with the time segment(s) during which commercials occurred.

In some implementations, the visualization module 308 may be configured to display supplemental information for a show automatically or responsive to a user selection, such as a discrete time interval selection or a selection of a show. More particularly, the visualization module 308/components thereof may be configured to display relevant supplemental data for any of the data depicted in regions 204, 206, 208, 260, etc. For example, upon hovering over certain data (e.g., outliers, dips, percentages, inbound or outbound network, meter, etc.), the visualization module 308/components thereof may display additional details relevant to that data.

By way of further example, as a discrete time interval is selected using the slider 116, the traffic chart module 312 may dynamically update an impressions metric 236 to reflect the total number of impressions at that time interval. This is advantageous as it allows a user to easily determine the traffic rate at the time interval for the first show. In another further, example, responsive to user interaction using an input device 114 (e.g., a hovering over or selecting a given traffic rate 226*a* . . . 226*n*), the traffic chart module 312 causes the interface 322 to dynamically display details about the show corresponding to that selection (e.g., the episode, time and date of first airing, actors in show, demographics associated with show, show rating information, a media clip of the show at a selected time interval, etc.) in a corresponding graphical region (e.g., an overlay, popup, window, content region, etc.), and so forth.

The traffic loss chart 206 displays information pertaining to the traffic loss over the time range 218, which, like the traffic chart 204, is comprised of a multiplicity of discrete time intervals. As shown more particularly in FIG. 2C, the traffic loss chart 206 displays the percentage of viewer traffic associated with the first show that is being lost at any given point in within the selected time range. The loss rate 238 is shown as having a possible range from 0% to some percentage above 0%, although it should be understood that other variations are also possible, such as where the polarity of the data is switched.

The traffic loss chart 206 may also include a visual representation of the average loss 240 and one or more standard deviations 246*a* and 246*b* from the average. The average loss 240 may be defined as any relevant value, such as an average (e.g., mean, median, mode, etc.) loss for a first show or for a first network over a specific time period (e.g., weeks, months, years, etc.). Alternatively, the average loss 240 may be defined as an average over competing shows or networks. In some implementations, the definition of the average may be user definable by the user selecting the graphical element 244 in the traffic loss chart legend 242 corresponding to the average loss 240.

In some implementations, the loss chart module 318 generates/updates the traffic chart 206 in response to receiving a signal from the interface module 316, which indicates the range of times (e.g., as selected in the time range region 218) and the selected time interval (e.g., corresponding to the position of the slider 216 along the time range region 218). The loss chart module 318 accesses the performance summary data and generates the graphical representation of the loss rate 238, average loss 240, standard deviations 246, emphasized markers 248, impressions lost metric 250, and/or the time interval metric 252 using the performance summary as indexed by time intervals. For instance, the data in Tables A and/or B illustrate statistics about shows including total outflow, average outflow, and standard deviations of outflows indexed over a range of time intervals for a plurality of shows, which data is input into the loss chart module 318 to generate the elements of the traffic chart 204. For example, the loss chart module 318 may retrieve/receive the total outflow (e.g., the loss rate) over a range of times and display it graphically in the traffic loss chart 206.

Similarly, depending on the configuration, the loss chart module 318 or the interface module 316 may access the commercial occurrence data indexed by time interval in the show performance summary (e.g., as indicated in the columns labeled commercial time, promo time, non-program time, etc., in Table A). For example, the loss chart module 318 may process the commercial occurrence data from the show performance summary and generate graphical overlay(s) 228 and overlay them in the traffic loss chart 206 with the time segments which include the commercial occurrences.

The loss chart module 318 and/or the traffic module 334 may determine one or more standard deviations from the average loss 240 and generate and display a visual representation of the standard deviations. For example, as displayed in FIG. 2C, a first and a second standard deviation 246a and 246b from the average are displayed in the traffic loss chart 206.

In some implementations the loss chart module 318 may determine if, and at which time intervals, the loss rate 238 exceeds a threshold. In some instances, the threshold corresponds to a quantity (e.g. percentage) greater than two standard deviations from the average 240. When it is determined that the loss rate 238 exceeds the threshold, the loss chart module 318 may present the point at which the loss rate 238 exceeds the threshold in such a way as to draw emphasis to the point. For example, that point may be displayed with an emphasized marker (e.g., a flashing, red circle, etc.) 248 around a point on a graph of the loss rate 238. Additionally, the emphasized marker 248 may be selectable (e.g., clickable, tappable, etc.) causing the loss chart module 318 to display a content region including analysis information to the user. This analysis information may include one or more predictions (e.g., ordered from most likely to less likely) explaining why the data for that particular data point/point in time exceeded the threshold, as determined by the traffic module 334.

In some implementations, the traffic loss chart 206 may include a traffic loss chart legend 242. Although other values may be present in the traffic loss chart legend 242, as depicted in the interface 322, the legend may include representations corresponding to the percent of loss 243 (e.g., the loss rate 238), the average loss 244, and one or more standard deviations 245a and 245b. In a similar manner to the traffic chart legend 224, as discussed above, the individual sections and/or elements within the sections of the traffic loss chart legend 242 may be color and/or pattern-coded and may be interactable to affect which of the elements of the traffic loss chart 206 are highlighted or displayed. For instance, they can be used to filter the values and factors contributing to the traffic loss chart 206, and so forth.

In some implementations, the traffic loss chart 206 may additionally or alternatively include other elements, such as a total impressions lost metric 250 and a time interval metric 252. The total impressions lost metric 250 may reflect the percent of total traffic (e.g., a percentage or a total value) lost over a time period (e.g., 15 minutes, an hour, etc., before, surrounding, or after a reference time, such as a current time or the selected time interval). The time interval metric 252 is a representation of a viewer loss percentage at a selected discrete time interval (e.g., position C of slider 216 in FIG. 2C).

The graphical traffic meter 208 is configured to visually comparatively display an instantaneous (e.g., at a time interval, real time, etc.) inbound viewer rate and an outbound viewer rate corresponding to a selected time interval (e.g., position D of slider 216). As shown in FIG. 2D, the traffic meter may include an inbound funnel portion 254 and an outbound funnel portion 256, each corresponding in size to the number (e.g., as a ratio) of inbound and outbound viewers. Additionally, in some implementations, the traffic meter 208 may include a comparative portion 258 (e.g., donut chart element), which visually graphically displays the ratio of inbound viewers to outbound viewers using visually distinguishable segments (e.g., colored segments, textured segments, etc.). In some instances, two visually distinguishable segments are present in the comparative portion 258 as shown, such that each segment corresponds to and is connected with the inbound funnel portion 254 and outbound funnel portion 256, respectively.

In some implementations, the meter module 314 generates the graphical traffic meter 208 in response to a signal from the interface module 316, which indicates a selected time interval (e.g., corresponding to the position of the slider 216 along the time range region 218). The meter module 314 determines the configuration (e.g., size, color, orientation) of the inbound funnel portion 254, the outbound funnel portion 256, and the comparative portion 258 using the performance summary at a selected time interval. For example, the meter module 314 may retrieve/receive the total inbound traffic and the total outbound traffic (e.g., as a ratio illustrated by the average audience change or the reach change in Table A, or as values represented by the various switch in and out flow values for each source as illustrated in Table A) for a selected time interval, which it uses to calculate and generate the configuration of the traffic meter 208 and its component elements.

The source comparison chart 260 visually comparatively displays inbound sources and outbound sources for a selected time interval. The source comparison chart 260 may include an inbound source list 210 and an outbound source list 212. Each of the lists 210 and 212 may include a percentage representing the percentage of the total inbound or outbound traffic represented by each source. In some implementations, as in the depicted implementation, the inbound source list 210 is connected to the inbound funnel portion 254 and the outbound source list 212 is connected to the outbound funnel portion 256. This configuration of the graphical traffic meter 208 and source comparison chart 260, where each of 210 and 254 as well as 212 and 256 are visually linked, is particularly beneficial, because it allows a user to quickly ascertain whether the total number of impressions is increasing or decreasing at any given moment as well as the ratios of sources responsible for that change.

As with the traffic meter 258, in some implementations, the meter module 314 generates the source comparison chart 260 in response to a signal from the interface module 316, which indicates a selected time interval. The meter module 314 determines the inbound source list 210 by retrieving/receiving the switch in rates and networks (e.g., shows) for each of the sources from the show performance summary (e.g., as illustrated in the switch in 1, 2, 3, etc., sets of columns in Table A) for the selected time interval. Similarly, the meter module 314 determines the outbound source list 212 by retrieving/receiving the switch out rates and networks (e.g., as illustrated in the switch out 1, 2, 3, etc., sets of columns in Table A).

Figure 2A:
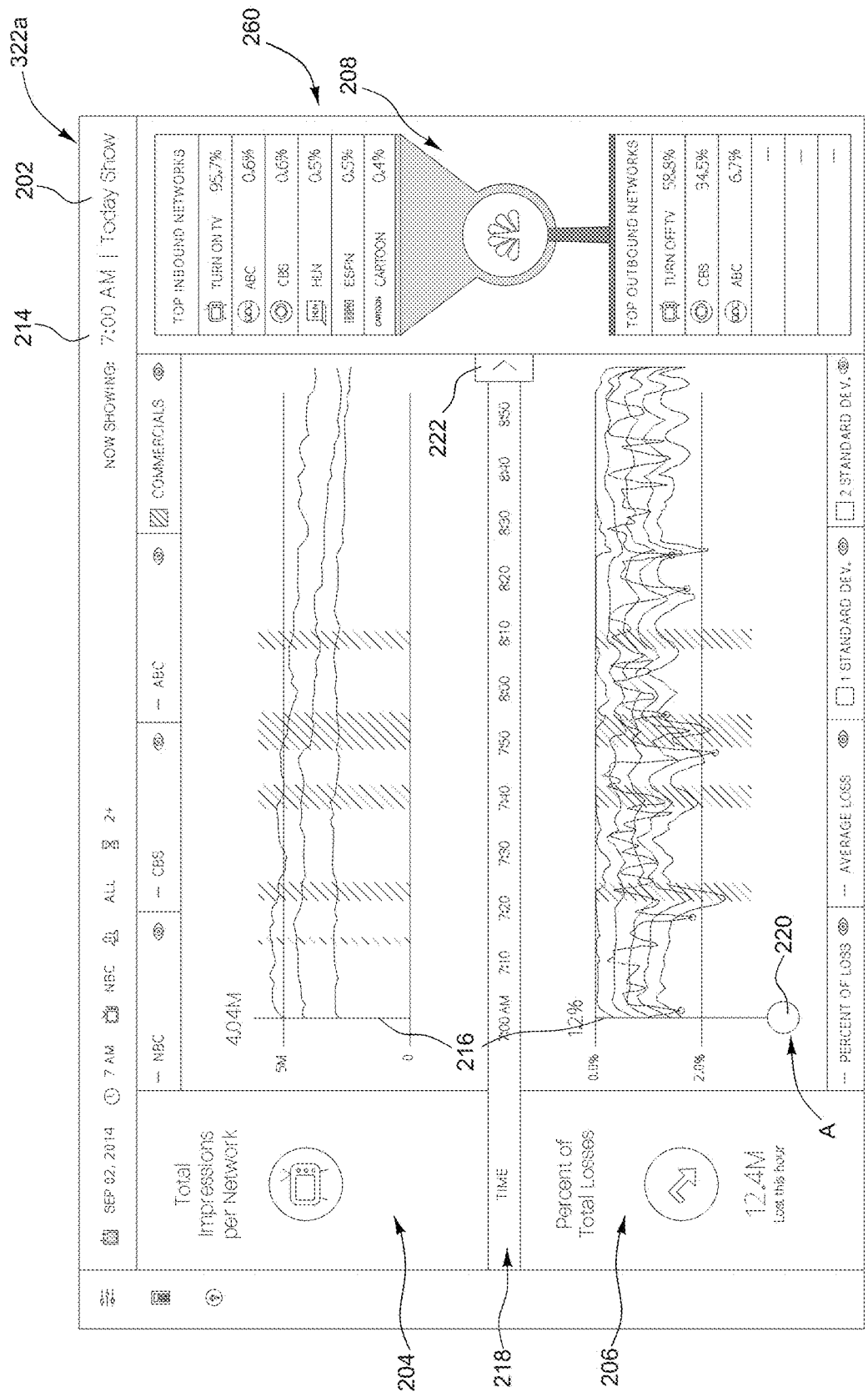
FIGS. 2A-2F illustrate example dynamic user-interactable graphical interfaces for providing a visualization of various elements of a show performance summary.
Figure 2B:
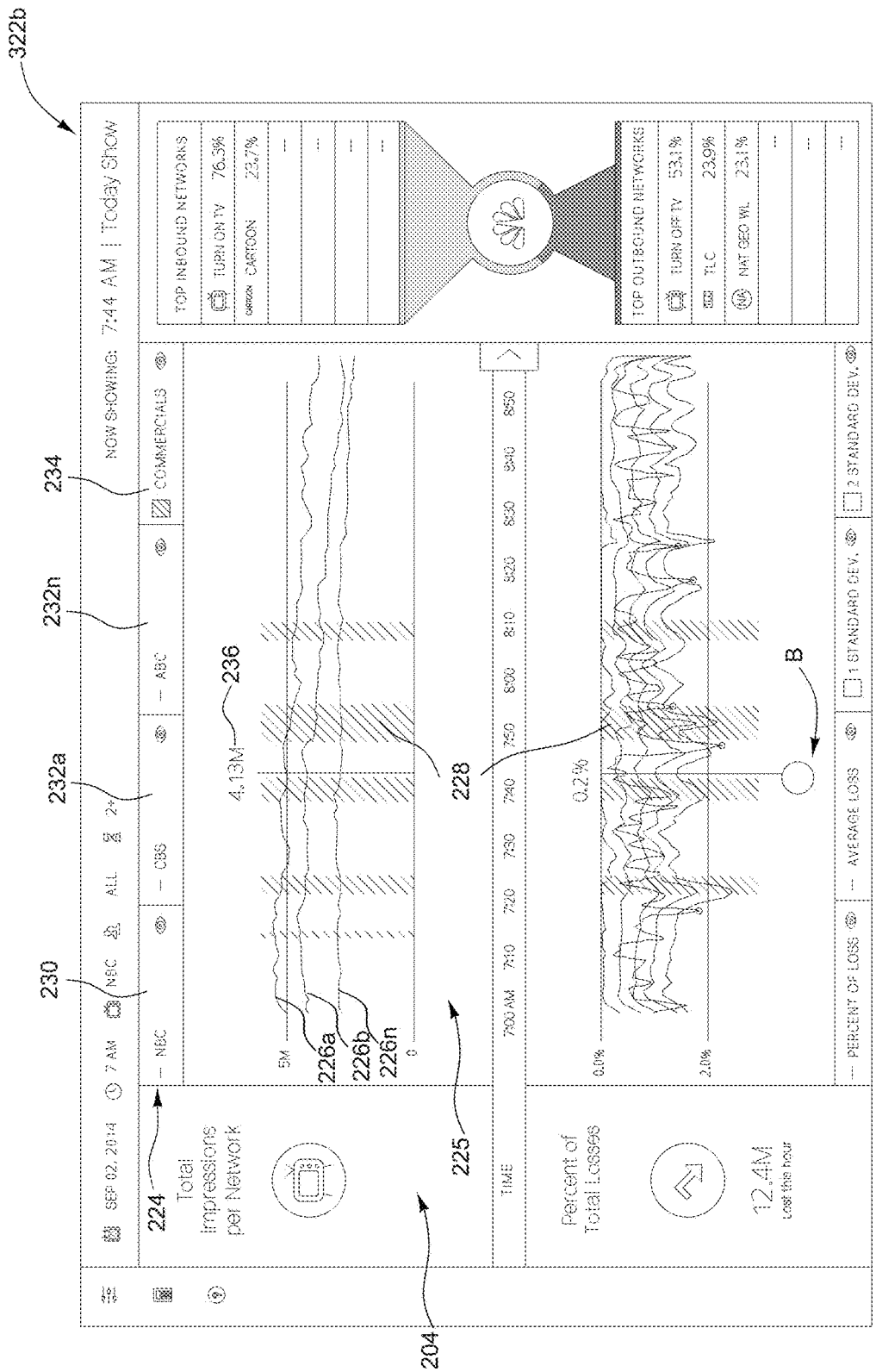

The organization of the components 312, 314, and 318 of the visualization module as described is particularly beneficial as it allows the visualization module 308 to rapidly (e.g., nearly instantaneously) process a large quantity of information such as is provided in the tables above while providing the information in a format, which is easily digestible for a human using a user device 306 as particularly illustrated in FIGS. 2A-3.

The progression of the dynamic synchronous changes to the interface 322 shown in FIGS. 2A-2F based on the respective positions A-F of the slider 216 are now described. More particularly, the interfaces 322a-322f in FIGS. 2A-2F display performance data for a first show (e.g., the Today Show) and one or more competing shows over the certain timeframe (e.g., 7-9 AM) across certain discrete time intervals selected by the user. For instance, FIG. 2A displays the slider 216 at position A in interface 322a corresponding to a selected interval at 7:00 AM, which is when the first show began. At position A, traffic rate 226b for the first show increased more than competing shows as shown in traffic chart 204, and as such traffic loss is decreasing as shown in loss chart 206. Further, as shown in the inbound source list 210, at position A, 95.7% of the inbound traffic was from viewers that just turned on their TVs, with the remainder of viewers coming from competing content providers.

FIG. 2B displays the slider 216 at position B in interface 322b corresponding to a selected interval at 7:44 AM. At position B, traffic rate 226b for the first show was increasing slightly as shown in traffic chart 204 and indicated in the proportionate size of the inbound funnel portion 254 (larger) to the outbound funnel portion 256 (smaller) as well as the comparative portion 258 of the traffic meter 208. Additionally, the loss rate 238 shown in the loss chart 206 is at a value less than the average loss 240. Further, as shown in the inbound source list 210, at position B, 76.3% of the inbound traffic was from viewers that just turned on their TVs, with the remainder of viewers coming from competing content providers.

Figure 2C:
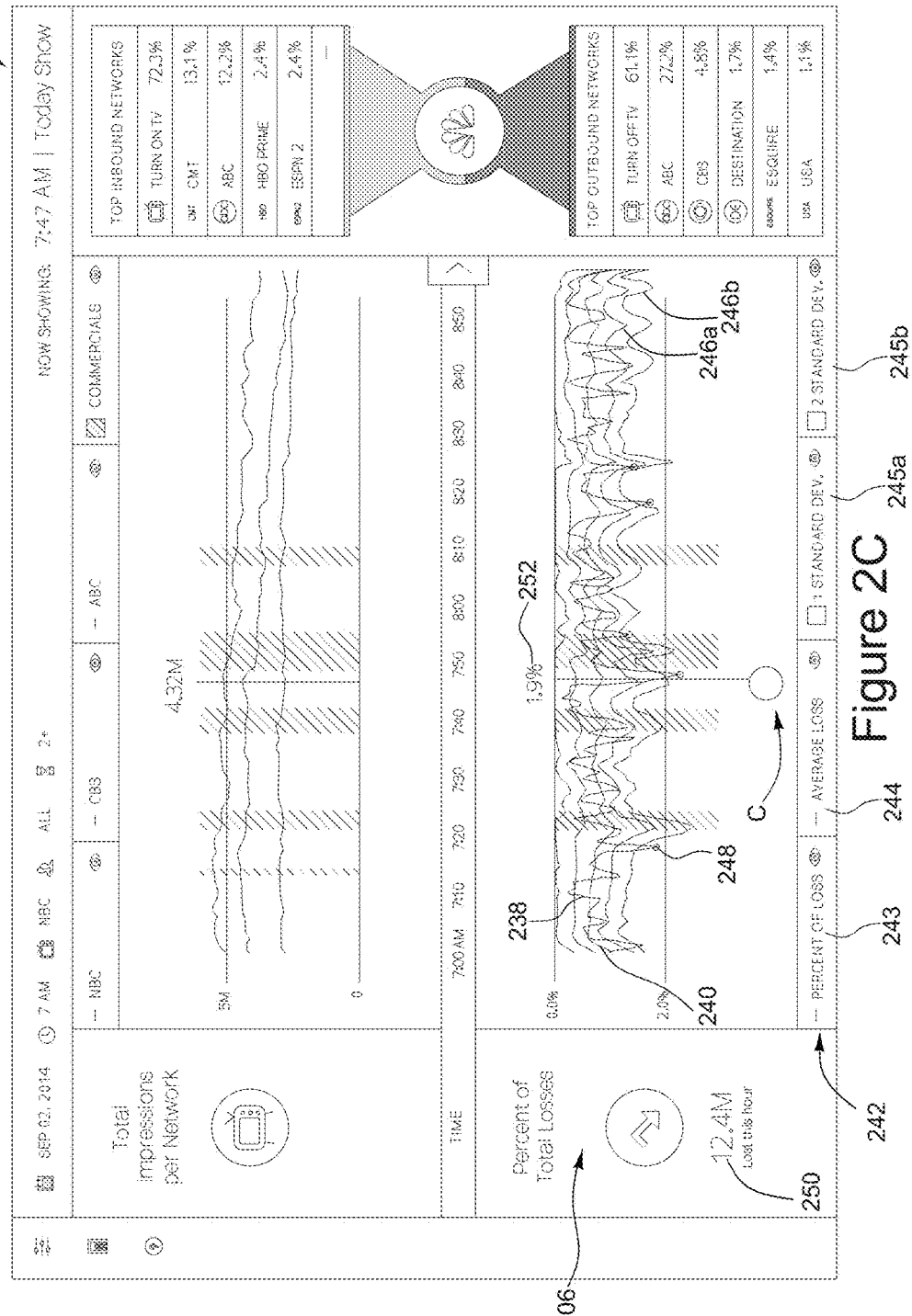
Figure 2D:
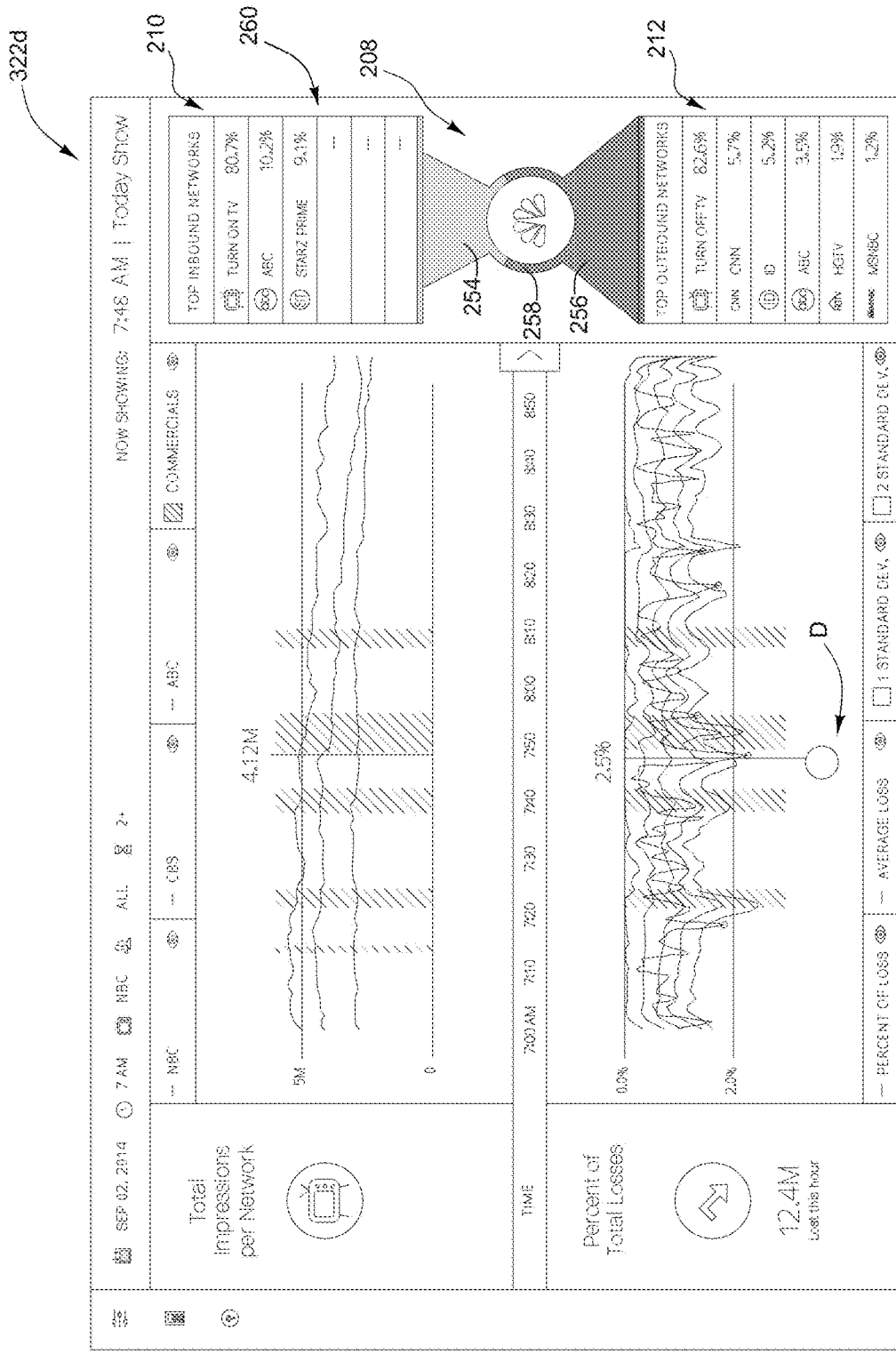

FIG. 2C displays the slider 216 at position C in interface 322c corresponding to a selected interval at 7:47 AM. At position C, traffic rate 226b (e.g., the total number of impressions) for the first show was nearly level as shown in traffic chart 204, but there was a significant loss rate 238, as indicated in the loss chart 206. The sizes of the inbound funnel portion 254 and the outbound funnel portion 256 as well as the comparative portion 258 of the traffic meter 208 indicate that although the loss rate 238 is greater than the average loss 240 at 7:47 AM and is decreasing, the inbound rate is significant enough that the total traffic rate 226b is essentially level. Further, as shown in the outbound source list 212, at position C, while 61.1% of the outbound traffic was from viewers that turned off their TVs, 27.2% of outbound traffic went to a single competing source.

FIG. 2D displays the slider 216 at position D in interface 322d corresponding to a selected interval at 7:48 AM. At position D, traffic rate 226b for the first show was decreasing significantly as shown in traffic chart 204 and indicated in the proportionate size of the inbound funnel portion 254 (smaller) to the outbound funnel portion 256 (larger) as well as the comparative portion 258 of the traffic meter 208. Additionally, the loss rate 238 shown in the loss chart 206 is at a value greater than two standard deviations from the average loss 240 and is indicated by the graph of the loss rate 238 and the marker 248. In contrast to the data displayed in the outbound source list 212 in FIG. 2C, 82.6% of outbound traffic is a result of viewers turning off their TVs, while only 5.7% and 5.2% of traffic is changing to the second and third sources, respectively. A likely explanation for this change, is that an increasing number of viewers are leaving for work, which explanation could be provided via the interface 322, as described elsewhere herein.

Figure 2E:
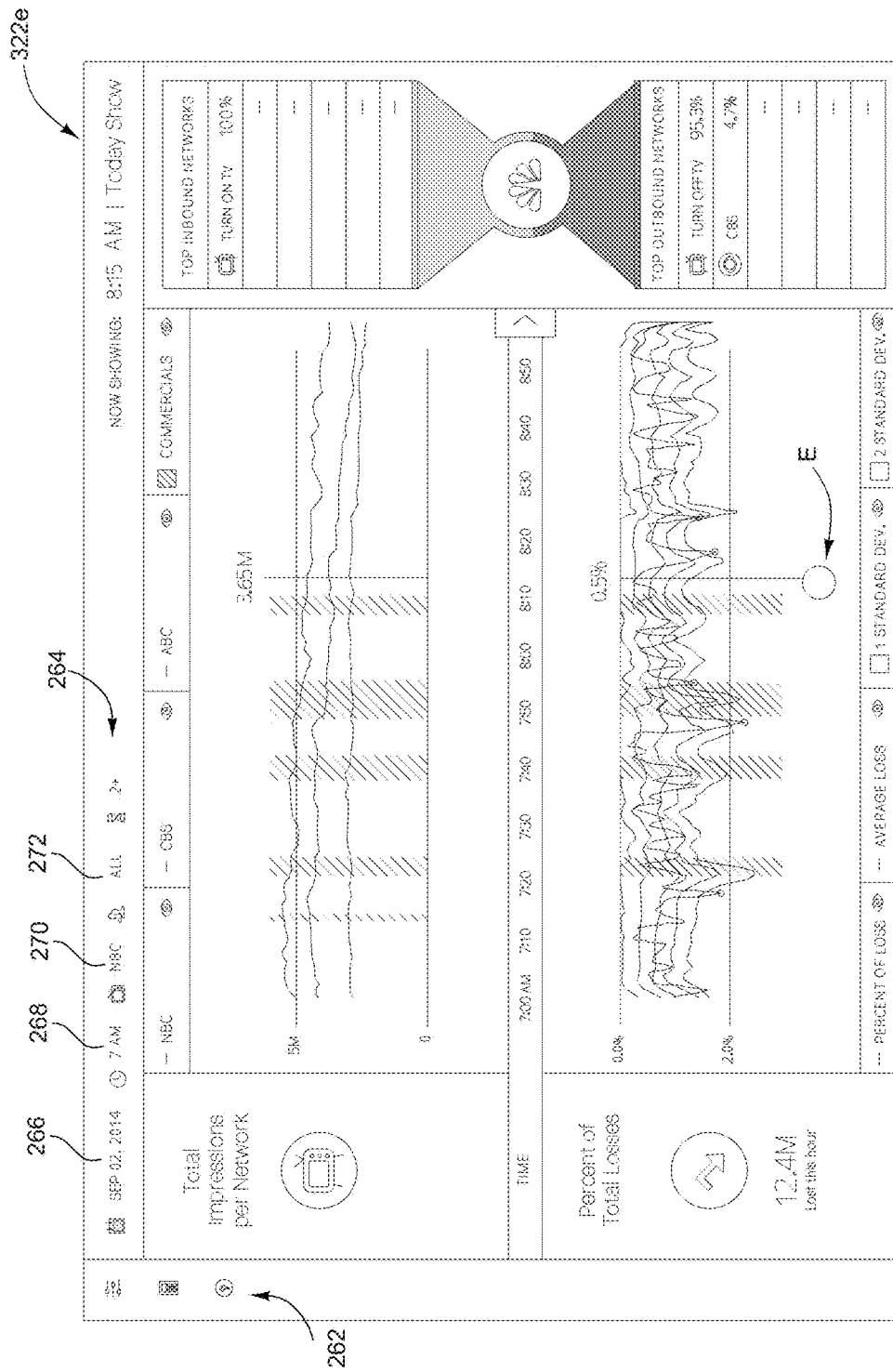

FIG. 2E displays the slider 216 at position E in interface 322e corresponding to a selected interval at 8:15 AM. At position E, traffic rate 226b for the first show was increasing very slightly as shown in traffic chart 204 and as indicated in the proportionate size of the inbound funnel portion 254 to the outbound funnel portion 256 as well as the comparative portion 258 of the traffic meter 208. Additionally, the loss rate 238 shown in the loss chart 206 is at a value less than the average loss 240. Further, as shown in the inbound source list 210, at position E, effectively 100% of the inbound traffic was from viewers that just turned on their TVs, but perhaps more interestingly, the outbound source list 212 indicates that 95.3% of the outbound traffic was from viewers turning off their TVs with the relatively small remainder going to a single other outbound source.

Figure 2F:
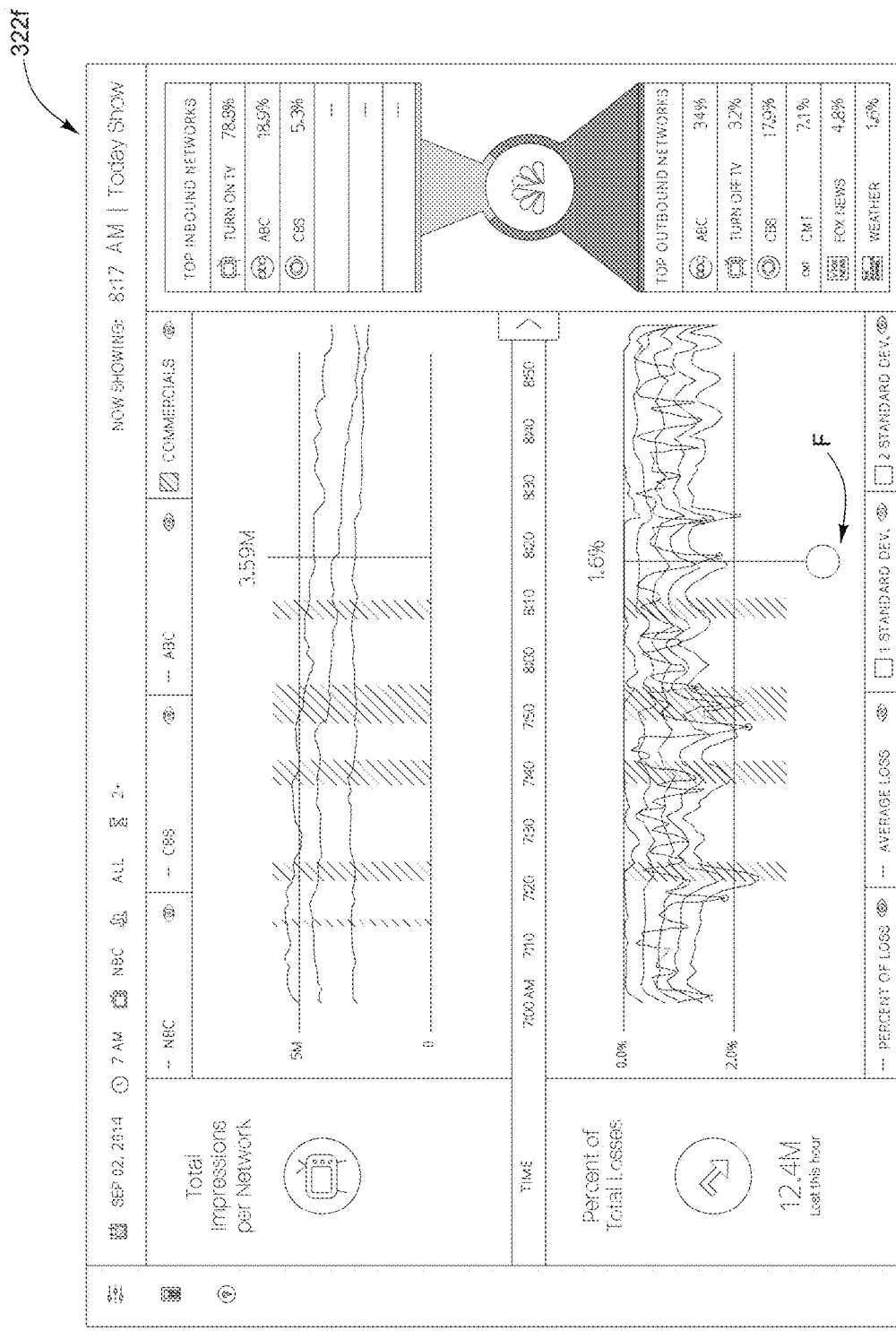

FIG. 2F displays the slider 216 at position F in interface 322f corresponding to a selected interval at 8:17 AM. At position F, traffic rate 226b for the first show was decreasing quickly as shown in traffic chart 204 and indicated in the proportionate size of the inbound funnel portion 254 (smaller) to the outbound funnel portion 256 (larger) as well as the comparative portion 258 of the traffic meter 208. Additionally, the loss rate 238 shown in the loss chart 206 is at a value greater than one standard deviation from the average loss 240. As shown in the outbound source list 212, at position F, 34%, 32%, and 17.9% of the traffic loss is going to the first three sources respectively, with only 32% of the traffic loss being from viewers turning off their TVs. Further, it can be seen from the traffic chart 204, that the first traffic rate 226b of the first show is performing much worse than the traffic rates 226a an 226c of the competing shows.

The interface 322 may additionally or alternatively include various other tools for filtering, interaction, and display of the show performance summary. For example, as shown in FIG. 2E, the interface 322 may include interface tools 262 (e.g., to change settings, make calculations, and request help, etc.) and filtering tools 264. The filtering tools 264 may perform the same or additional functions as those described above in reference to interactions with other elements of the interface 322. For example, the filtering tools 264 may include a calendar 266, which allows a user to select a date or date range over which to view show performance summary data. In another example, the filtering tools 264 may include a time 268, which allows a user to select a range of times 218, a start time, an end time, a time of day (e.g., primetime), etc.

The filtering tools 264 may include a show or network filter 270, such as the show menu discussed above. Selection of this filter may allow a user to specify a first show or network and/or one or more competing shows or networks. In some instances, the show or network filter 270 includes a display reflecting the selected first show or network, that is, the show or network to which other shows or networks are compared and for which the show performance summary is generated.

The filtering tools 264 may include a demographics filter 272, which allows a user to select one or more specific demographics for which data is displayed. For example, demographics that may be used for filtering may include age, gender, geographic location, household income, viewing patterns habits or history, etc., depending on availability of demographic data linked to the data inputs in the performance summary.

The shows depicted in the interface 322 may be selected using a show menu (e.g., not shown) and an input device 114. The step of selecting the shows may occur in an interface depicted prior to the presentation of the interface 322, or may occur concurrently with or after the display of that interface. For example, the user may select using the input device 114 an element in the header region of the interface 322, such as the show identifier element 202 or the traffic chart legend 224 (or elements thereof), and responsive thereto, show a graphical selection menu that includes a plurality of shows. In some instances, the shows included in that region may be shows associated with certain content providers, shows the user has set as preferences or is authorized to select from, the popular shows of the day based on traffic, etc. The user may input using the input device 114 which show is the target show (the first show (e.g., 230)) and the comparison shows (e.g., 232a . . . 232n). Upon making the selection, the visualization module 308 may request the relevant performance data and generate/refresh the interface 322 with the corresponding data.

In further implementations, the user may change, using the input device 114, which show is the target show by highlighting the show of interest (e.g., by selecting it in the traffic chart legend 224 or the chart region 225). For instance, the user may select using the input device 114 the first show indicator 230 or one of the competing show indicators 232a . . . 232n to change that show to the "first show" or target show, and the visualization module 308 may synchronously update each of the elements 202, 204, 206, 208, 210, and 212 to reflect the selected show's performance, and, in some instances, a comparison of the performance of the show to that of the other shows.

Although the FIGS. 2A-2F describe the comparison of a first show and one or more contemporaneous competing shows, it should be understood that the techniques of the present disclosure are also applicable to non-contemporaneous shows. In some implementations, the traffic module 334 may process a show performance summary for a first show and one or more non-contemporaneous shows by matching features such as the time line of the shows, commercial occurrences, etc. For example, the traffic module 334 may match the beginning and ending times of shows such that the visualization module 308 displays the shows as though they were contemporaneous (although, perhaps some data may be mismatched or artificially adjusted, such as the visual overlays corresponding to commercial occurrence data for each show).

Examples of non-contemporaneous shows which may be compared using the techniques described herein include: similar types of shows occurring at different times; OTA, on-demand, online streaming, and/or recorded shows; the same show or series (e.g., as in a television series) on previous occasions; a different show or series on the same network (e.g., at a different time, day, or season); and so forth.

FIG. 8 illustrates a further example dynamic user-interactable graphical interface 822 generated using the show performance summary. It should be understood that similar modules and techniques generate the interface 822 depicted in FIG. 8 as generate the interface 322 depicted in FIGS. 2A-2F. The description of these modules and techniques will not be repeated in detail here.

The interface 822 includes a number of static and dynamic elements configured to efficiently present, compare, and allow for user interaction. As shown, the interface 822 may include a first show identifier 802, a traffic chart 804, a traffic loss chart 806, a slider 816, a time range region 818, a media preview region 890 (also called show preview region 890), as well as and various other data display, filtering, and interaction tools. The generation and updating of the interface 822 occurs using the same or similar techniques as described in reference to the interface 322. Similarly, a user can interact with the interface 822 using a draggable user interface element that is used to select a discrete time interval within the interface 822, such as the slider 816, to select a time interval.

The traffic chart 804 includes a visual representation of the traffic rate 826, an impressions metric 836, one or more commercial overlays 828, and a show selector 880. The elements 826, 836, and 828 are generated and reflect the same or similar type of data as within the elements 226, 236, and 228, respectively. Similarly, the show selector 880 displays one or more currently selected shows (e.g., indications of a first show and/or one or more competing shows) and allows a user to select the shows in order to display traffic data in the traffic chart 804 for the selected shows. For example, the interface module 316 receives user input indicating a selected time interval and/or a show selected in the show selector 880. The interface module 316 signals the traffic chart module 312 to generate the traffic chart 804, which it does in the same or similar way as is described in detail in reference to FIGS. 2A-2F.

As with the traffic loss chart 206, the traffic loss chart 806 displays information pertaining to the traffic loss over the time range 818, which is comprised of a multiplicity of discrete time intervals. The traffic loss chart 806 may include visual representations of an average loss rate 840, a loss rate deviation 846, an emphasized marker 848, a time interval metric 852, one or more commercial overlays 828, a first source loss rate 882, a total loss rate 838, and/or an outbound source selector 888. The elements 840, 846, 848, 852, and 828 correspond to the elements 240, 246, 248, 252, and 228 described above.

The first source loss rate 882 includes a graphical representation of the total (e.g., as a percentage) traffic loss due to a first source, which representation may be toggled on or off using the outbound source selector 888. Similarly, the total loss rate 838 includes a graphical representation corresponding to the total traffic lost at each time interval similar to the loss rate 238. However, in some implementations, the total loss rate 838 may represent only the traffic loss due to the sources selected in the outbound source selector 888. The outbound source selector 888 allows a user to toggle which sources are represented in graphical representations in the traffic loss chart 806. For example, the interface module 316 receives user input indicating a selected time interval and/or sources selected in the outbound source selector 888. The interface module 316 signals the loss chart module 318 to generate the traffic loss chart 806, which it does in the same or similar way as is described in detail in reference to FIGS. 2A-2F.

As with the time range region 218, the time range region 818 reflects the time range of the performance data being displayed in the interface, however, the time range region 818 may also include a loss rate mirror 839. As shown, the loss rate mirror 839 is overlaid over the time range region 818, to display an easily viewable representation of a loss rate (e.g., the loss rate 838).

The media preview region 890 provides a preview of a media object of the show. The media object is a digital object, such as a graphics, video, and/or audio file of the show and is streamable or downloadable from the media server 350. The preview of the show media object may be a digital preview associated with the selected time interval, such as but not limited to a media clip associated with the selected time interval (e.g., a clip of limited duration showing the before, during and after), the media (e.g., video) frame corresponding to the selected time interval, an animated image (e.g., a GIF) showing the same, the media object data with a position set to the selected time interval, etc., (e.g., using a seek (int time) function of an API of the media module 356).

In some implementations, the media module 356 includes media player embedded in the media preview region 890. For example, the media preview region 890 may include an embedded video player in an iframe object or other container backing the interface 822. The media player interacts with an information source (e.g., local cache, the media server 350, etc.) to retrieve the media object to be displayed and/or interacted with. In some implementations, metadata of a video clip of the show may be included in the data store 108, indexed by the time interval, and used to display a video clip or frames of the video clip corresponding to the selected time interval. It should be understood that other implementations are possible and contemplated by the techniques described herein.

In some implementations, the media object is encoded using various formats and/or audio and video codecs. In some instances, the media object may be encapsulated into a container. The image formats, audio and video codecs, container formats, etc., may be open or proprietary, and may include any type. Example image formats may include but are not limited to GIF, JPEG, EXR, PNG, TIFF, etc., example audio and video codecs and formats may include but are not limited to ACC, MP3, Vorbis, etc., and example video codecs and formats may include but are not limited to MPEG-4, H.264, Theora, VP8, etc. The container file may package the media object and/or a data stream associated therewith in any known format including but not limited to FLV, WebM, ASF, ISMA, etc. It should be understood that in some instances the images of the media object or the media object itself be transcoded and/or converted to another image-based format.

In some instances, the media module 356 receives a media object (e.g., audio video stream, static image, audio from the media server 350 responsive to sending a media request to the media server 350. In some instances, the media request is triggered upon page load and the media object or a portion thereof is downloaded and cached/buffered in the memory 106 for instant retrieval (so that any lag is imperceptible to the user). In other instances, the media request is a preview request triggered upon the user interaction with the data displayed in the dynamic user-interactable graphical interface (e.g., hovering over a data point using an input device, selecting a certain data point/time increment using an input device, etc.). The preview request includes a corresponding time increment matching the user selected time interval and, responsive to receiving and processing the request, the media server 350 retrieves and provides the media object (e.g., frame(s), image, media stream positioned to the selected point in time, etc.) to the media module 356, which may buffer and/or display it in the media preview region 890.

In implementations where the media object is a video, the media preview region 890 displays the media object corresponding to a selected time interval. The media preview region 890 may in some cases include media player controls, such as a stop, play, pause, rewind, and fast-forward button, to control playback of the media object. For example, in some implementations, the user may select to play a video clip of a show, which is displayed in the media preview region 890.

In some implementations, as the media object is played, the media module 356 continuously updates the position of the media preview region 890 to correspond to the relevant time increment. For instance, in FIG. 8, the media preview region 890 may incrementally be repositioned horizontally across the time range region 818 in the interface 822 such that the media preview region 890 remains adjacent to the corresponding time and show performance summary data (e.g., the traffic rate 826, the loss rate deviation 846, etc.).

In other example implementations, the media module 356 may automatically reposition the media preview region 890 based on input received from the input device 114. For example, the input may reflect that the user is dragging the media preview region 890 across the interface 822 (e.g., by selecting and dragging the region 890 or the slider 816), and the media module 356 may refresh the media preview region 890 with the media object/portion thereof that corresponds to the position of the media preview region 890 within the interface. In further examples, the media module 356 may reposition the media preview region 890 to follow a pointer controlled by the user and may refresh the content being displayed by the media preview region 890 accordingly. Other variations are also possible and contemplated.

FIG. 3 is a block diagram of an example system 300 for analyzing and enabling visualization of viewer traffic. The illustrated system 300 may include the client devices 306a . . . 306n (also referred to herein individually and/or collectively as 306), audience measurement systems 340a . . . 340n (also referred to herein individually and/or collectively as 340), which are electronically communicatively coupled via a network 302 for interaction with one another, although other system configurations are possible including other devices, systems, and networks.

The client devices 306a . . . 306n, and their components, may be coupled to the network 302 via signal lines 304a . . . 304n. The audience measurement systems 340a . . . 340n may be coupled to the network 302 via signal lines 338a . . . 338n. The analytics server 330 and its components may be coupled to the network 302 via signal line 328. Users may access one or more of the devices of the system 300. For example, as depicted, users may access and/or interact with the client devices 306a and 306n.

The client device 306 includes one or more computing devices having data processing and communication capabilities. The client device 306 may couple to and communicate with other client devices 306 and the other entities of the system 300 via the network 302 using a wireless and/or wired connection. Examples of client devices 306 may include, but are not limited to, mobile phones, tablets, laptops, desktops, netbooks, server appliances, servers, virtual machines, TVs, etc. The system 300 may include any number of client devices 306, including client devices of the same or different type. A plurality of client devices 306a . . . 306n are depicted in FIG. 3 to indicate that the analytics server 330 and its components may aggregate measurement data from a plurality of devices and provide show performance information to a multiplicity of users via the client devices 306a . . . 306n.

As depicted in FIG. 3, a client device 306 may include a visualization module 308 and a display 116, although it may also or alternatively include the aggregation module 332, the traffic module 334, or components thereof.

As shown, the visualization module 308 may include a data handler 310, a traffic chart module 312, a meter module 314, an interface module 316, a loss chart module 318, and a media module 356, although it should be understood that other configurations are also contemplated where some or all of the foregoing components are combined and/or further segmented into individual components, all of which are encompassed by the scope of this disclosure. For instance, in other implementations, one or more of the components, acts, and/or functionality of the visualization module 308 may be included on the analytics server 330, and/or one or more of the components, acts, and/or functionality of the analytics server 330 may be included on the client device 306a.

The data handler 310 may handle data requests and responses, and/or provide data to the other components of the system 300 (e.g., the client device 306), such as the traffic chart module 312, the meter module 314, and/or the loss chart module 318, as applicable.

The interface module 316 may be configured to capture and processes user interaction with the interface 322, and provide the interactions (e.g., time selections, filter selections, etc.) to the various different components, such as the traffic chart module 312, the meter module 314, and/or the loss chart module 318. The interface module 316 may also be configured to call and receive information from each of the other components of the visualization module 308. For example, the interface module 316 receives input from a user device 306, processes the input, and calls the other modules 308, 310, 312, 314, 318, and 356 to perform their respective operations.

The traffic chart module 312 may process the show performance summary, which may include information such as viewer traffic comparison data and commercial occurrence data, that is received from server 336 or local storage, and generate and/or update a traffic chart based on the processed data and/or the user interaction(s) (e.g., time selected using handle 220).

The meter module 314 may process ranked inbound and outbound sources from the performance summary to determine top inbound and outbound sources for a certain interval of a selected show or timeslot, and generate and/or update a source comparison chart 260 comparing total viewer gain vs. loss rates and listing top inbound and outbound sources based on the processed data and/or the user interaction(s) (e.g., time selected using handle 220), as discussed in further detail elsewhere herein.

The loss chart module 318 may process viewer loss data from the performance summary received from the server 336 and/or local data storage and generate and/or update an interactive traffic loss chart 206 indicating viewer loss percentages over the duration of show or timeslot based on the processed data and/or the user interaction(s) (e.g., time selected using slider 216), as discussed in further detail elsewhere herein.

The media module 356 programs the processor(s) 104 to retrieve, process, and display media objects based on user interaction with the dynamic user-interactable graphical interface, as discussed elsewhere herein. The media module 356 is capable of detecting input events (e.g., page loading, user input (e.g., user selection of time interval), default time interval selection, realtime position of media, etc.) and generating and positioning the show preview region 890, updating the position of the show preview region 890, and/or updating the media object being displayed thereby, etc.

The visualization module 308 may overlay (e.g., in cooperation with the foregoing modules) commercial data segments indicating locations of commercial breaks during showing (airing, playback, etc.) on any of the graphical images generated by the traffic chart module 312 and/or the loss chart module 318, as discussed in further detail elsewhere herein.

The visualization module 308 may communicate via the network 302 with the server 336 to provide, request, and/or receive information, such as the performance summaries discussed elsewhere herein. The visualization module 308 may use any suitable networking or other communication protocol to interact with the other components of the system 300, such as those discussed elsewhere herein.

The network 302 may include any number of networks and/or network types. For example, the network 302 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The analytics server 330 and the audience measurement systems 340 include computer hardware and software having data processing, storing, and communication capabilities, as discussed elsewhere herein. For example, the components 330 and/or 340 may include one or more hardware servers, server arrays, storage devices and/or systems, etc. In some implementations, the components 330 and/or 340 may include one or more virtual servers, which operate in a host server environment. As depicted, the analytics server 330 may include an aggregation module 332, a traffic module 334, and a server 336, as discussed elsewhere herein.

In some implementations, the media server 350 transmits media streams (e.g., audio and/or video) to one or more client devices 306 and/or the analytics server 330. The media streams may be live feeds or may be previously recorded, stored as media objects in a data store, and transmitted to the one or more client devices 306 or the analytics server 330 on demand, via delayed broadcast, etc. In some implementations, the media is streamed from the media server 350 via the network 302 (e.g., as illustrated by signal line 352). In other implementations, a user can download an instance of the media objects from the media server 350 to a local repository for storage and local playback. In some implementations, the media server 350 may be configured to provide a series of images (frames, thumbnails, etc.) corresponding to the selected time interval, as described in more detail in reference to FIG. 8. In some instances, the media object is indexed by time, frame, or another suitable measure, so it, or the corresponding portion thereof, can be immediately be retrieved upon request by the media server 350 and/or media module 356.

It should be understood that the system 300 illustrated in FIG. 3 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 4:
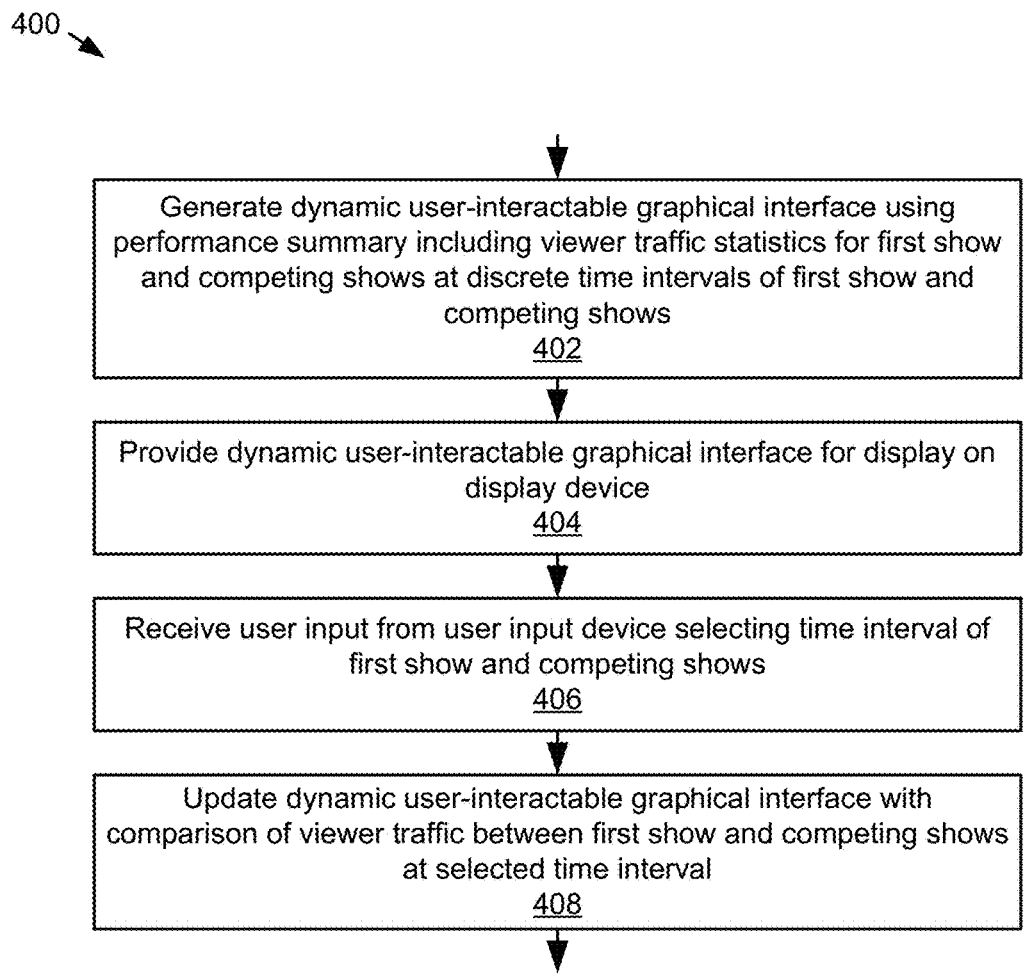
FIG. 4 is a flowchart of an example method for analyzing and enabling visualization of viewer traffic.

FIG. 4 is a flowchart of an example method 400 for analyzing and enabling visualization of viewer traffic. At 402, the visualization module 308 generates a dynamic user-interactable graphical interface (e.g., the interface 322) using a performance summary including viewer traffic statistics for a first show and one or more competing shows, and at 404, the visualization module 308 provides the dynamic user-interactable graphical interface for display on a display device.

In some implementations, the user-interactable graphical interface is generated responsive to receiving a user input. For instance, the interface module 316 receives the input from a user device 306 requesting the interface 322 (or an update thereof), in response to which the interface module 316 signals the data handler 310 to request a show performance summary from the analytics server 330. The server 336 may communicate the request to the traffic module 334, which generates the show performance summary based on information gathered by the aggregation module 332 (e.g., in advance, in response to information contained in the request from the data handler 310, etc.) from at least one source, such as the audience measurement system 340a. In some instances, the traffic module 334, via the server 336, transmits the show performance summary to the data handler 310. The data handler 310 may store the show performance summary in non-transitory memory and/or provide it to other component(s) of the visualization module 308. The various components of visualization module 308 may receive/retrieve the show performance summary and process it to generate and/or dynamically update various content included in dynamic user-interactable graphical interface, as discussed in further detail elsewhere herein. In further implementations, the data handler 310 may retrieve the show performance data from a local cache.

At 406, the interface module 316 receives user input from a user input device selecting a time interval of a first show and one or more competing shows, and at 408, the visualization module 308 updates the dynamic user-interactable graphical interface with a comparison of viewer traffic between the first show and one or more competing shows for the selected time interval. For instance, in some implementations, in response to receiving the input, the interface module 316 signals the traffic chart module 312 to receive/retrieve a show performance summary. The show performance summary may include information indexed by time interval, such as the network, time, program, and average audience data provided in the corresponding columns of Table A above. For example, the traffic chart module 312 processes the traffic reach/average audience as indexed by time interval of each of the first show and the one or more competing shows to produce a traffic chart, such as the traffic chart 204 or 804 discussed elsewhere herein.

In some implementations, the components of the visualization module 308 synchronously update a plurality of elements of the interface 322 using the performance summary such that a user may be able to drag a slider 216 (e.g., using the handle 220) over a range of times, thereby selecting various time intervals and causing the interface module 316 to synchronously update one or more elements of the interface for those time intervals (e.g., the interfaces 322 and/or 822).

Figure 5:
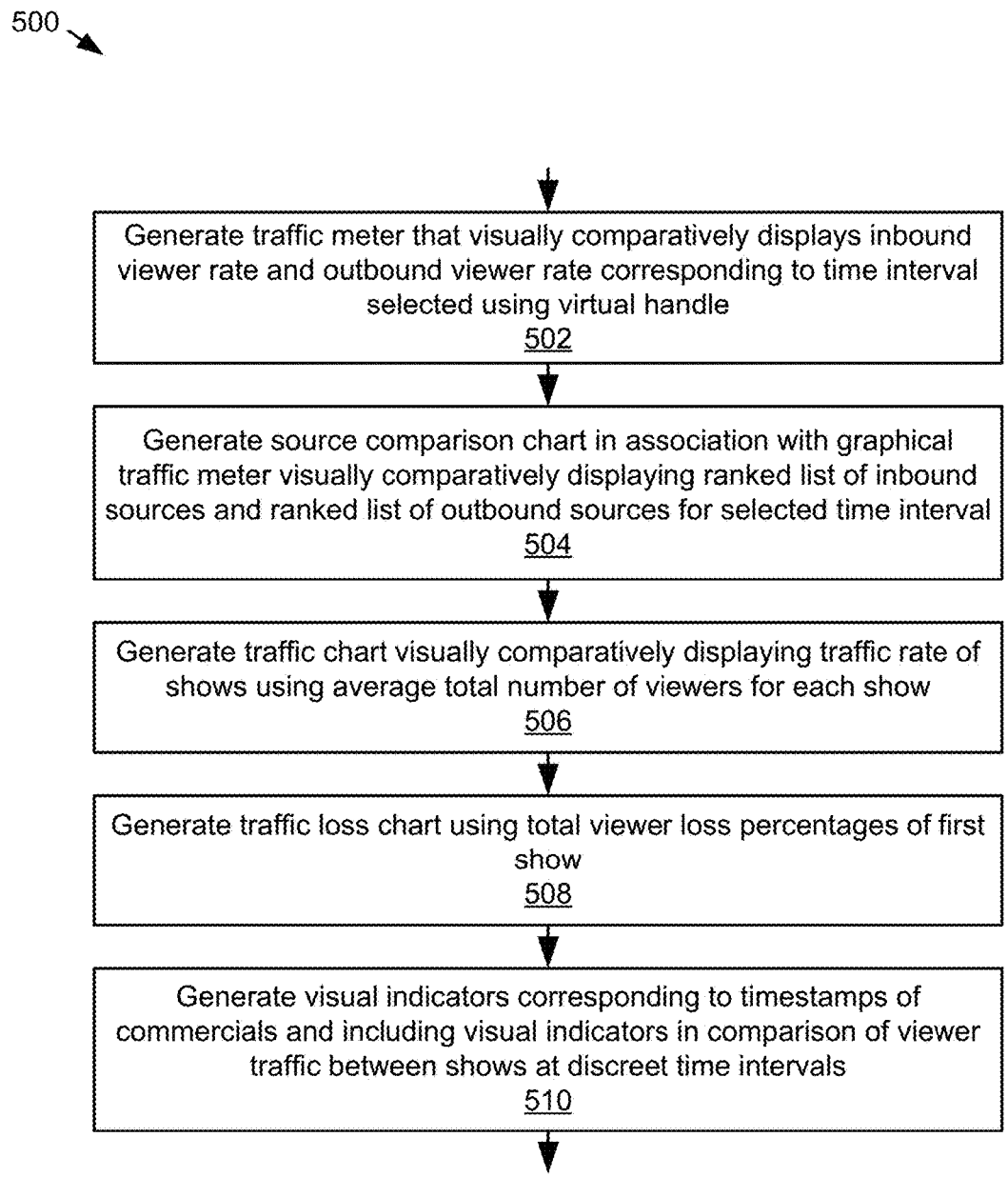
FIG. 5 is a flowchart of an example method for generating a dynamic user-interactable graphical interface using a performance summary for a first show and one or more competing shows.

FIG. 5 is a flowchart of an example method 500 of generating a dynamic user-interactable graphical interface using a performance summary for a first show and one or more competing shows.

At 502, the meter module 314 generates a traffic meter that visually comparatively displays one or more inbound viewer rates and one or more outbound viewer rates corresponding to a time interval selected by a user using a virtual handle (e.g., the handle 220) and, at 504, the meter module 314 may generate a source comparison chart in association with the graphical traffic meter visually comparatively displaying the ranked list of inbound sources and ranked list of outbound sources for the selected time interval. In some instances, the meter module 314 processes the performance summary to determine inbound and outbound sources, rank the inbound and outbound sources, and/or determine what percentage of the total inbound or outbound traffic corresponds to each source. In other instances, the traffic module 334 performs these operations, while the meter module 314 receives/retrieves (e.g., via the data handler 310) the lists of sources and determines the appropriate size, shape, content, and placement of the inbound sources list 210, the outbound sources list 212, and the traffic meter 208. For example, the source comparison chart 260 may include an inbound sources list 210 and an outbound sources list 212 placed at opposing sides of the traffic meter 208 such that it appears as though those sources are feeding or being fed by the meter 208, such as is displayed in FIGS. 2A-2F.

At 506, the traffic chart module 312 generates a traffic chart visually comparatively displaying a traffic rate of at least one of a first show and one or more competing shows using the average total number of viewers for each show. As described elsewhere herein, the traffic chart module 312 processes the show performance summary (e.g., as provided by the analytics server 330) to generate and/or update the traffic chart 204.

At 508, the loss chart module 318 generates a traffic loss chart using total viewer loss percentages of a first show. In some implementations, the loss chart module 318 may process the show performance summary and/or access additional information stored on the data store 108 to determine and generate the elements of the traffic loss chart 206 as described in reference to FIGS. 2A-2F. For example, the loss chart module 318, in conjunction with the traffic module 334, may determine a loss rate 238, an average loss, and one or more standard deviations 246a and 246b at a plurality of time intervals, which the loss chart module 318 uses to generate a traffic loss chart 206.

At 510, the visualization module 308 generates visual overlays corresponding to commercials and including visual indicators comparing viewer traffic between shows at discreet time intervals. For example, the visualization module 308 may overlay visual overlays corresponding to commercial occurrence data over one or more of the traffic chart 204 and the traffic loss chart 206, as depicted in FIG. 2.

In some implementations, the method 500 may be performed at page load, as real-time show performance summary data is received from the server 330, and/or as user interactions with the dynamic user-interactable graphical interface are received and processed. For example, a selection received from a user (e.g., via an input device 114) is detected by the interface module 316, which in turn notifies the various components of the visualization module 308 (e.g., traffic chart module 312, the meter module 314, the loss chart module 318) regarding the selection. The traffic chart module 312, the meter module 314, the interface module 316, and/or the loss chart module 318 then process relevant data corresponding to the selection and update corresponding content regions (e.g., the traffic chart 204; the traffic loss chart 206; and the graphical traffic meter 208, the ranked list of inbound sources 210, the ranked list of outbound sources 212, etc., as shown in FIGS. 2A-2F; the traffic chart 804, the traffic loss chart 806, the media preview region 890, etc., as shown in FIG. 8, etc.) with data specifically associated with the input selection.

Figure 6:
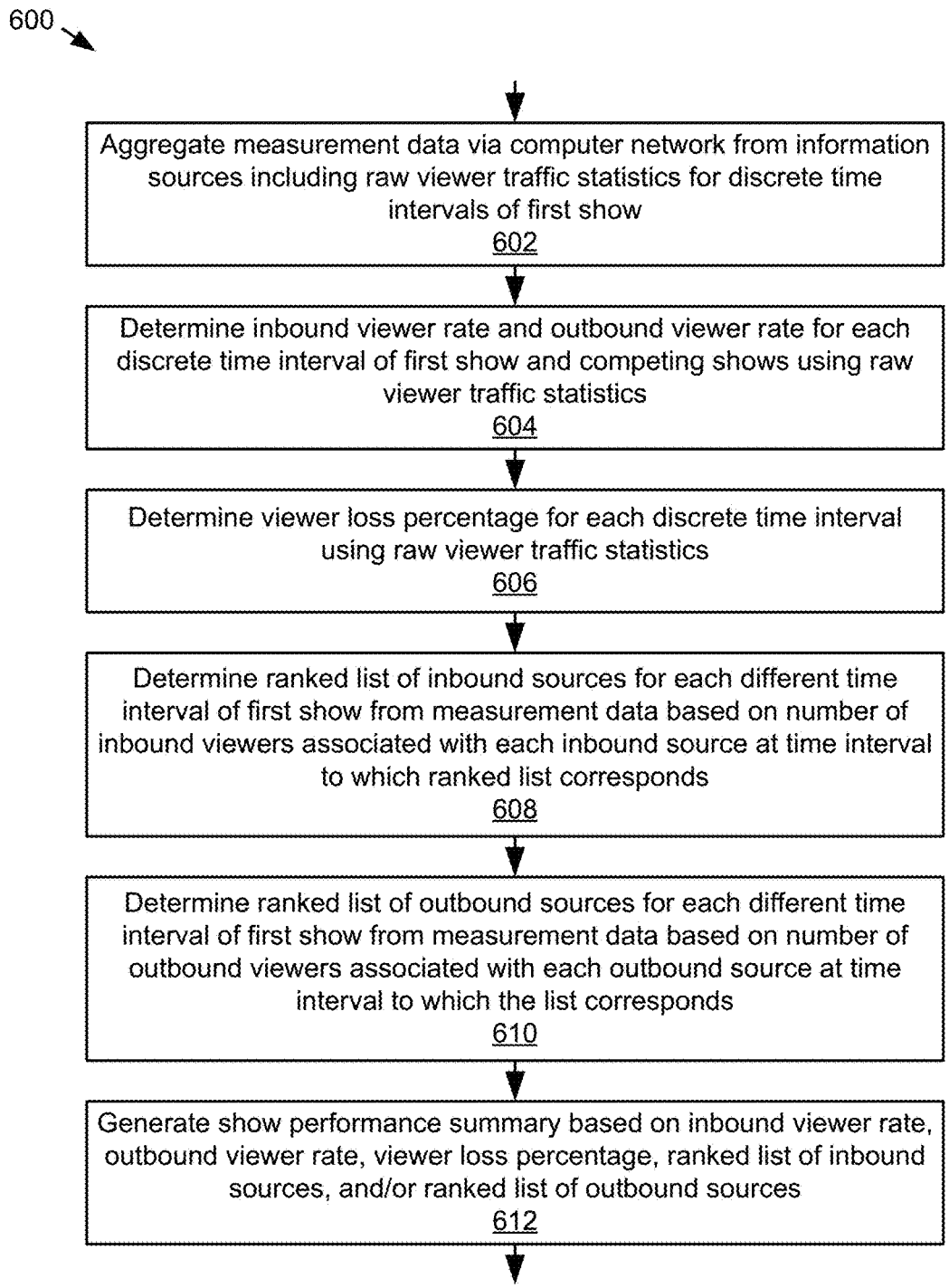
FIG. 6 is a flowchart of an example method for generating an example show performance summary.

FIG. 6 is a flowchart of an example method 600 for generating an example show performance summary. At 602, the aggregation module 332 may aggregate measurement data via a computer network from information sources including raw viewer traffic statistics for discrete time intervals of the first show. In some implementations, the aggregation module 332 receives raw viewer statistics or other measurement data from one or more information sources such as an audience measurement system(s) 340. For instance, the example input data in the table above provides examples of raw viewer statistics and measurement data. The aggregation module 332 may then filter or augment the raw viewer statistics data to only the relevant data, filter the data to an appropriate date/time range, analyze (e.g., perform statistical analysis) or send the data for analysis (e.g., the traffic module 334). Once the analysis has been performed, the aggregation module 332 may send the output. For instance, the example output data in the table above provides examples of the output of the aggregation module 332. The appropriate date/time range may be determined by administrative settings, date/time specific to airing of the first show and/or competing shows, and/or as set by a user interaction with the interface 322, as described herein.

At 604, the traffic module 334 may determine one or more inbound viewer rates and one or more outbound viewer rates for each discrete time interval of at least first show and one or more competing shows using raw viewer traffic statistics, such as the input or output of the aggregation module 332. At 606, the traffic module 334 may determine viewer loss percentage for each discrete time interval using raw viewer traffic statistics. At 608, the traffic module 334 may determine a ranked list of inbound sources for each different time interval of at least a first show from measurement data including a number or percentage of inbound viewers associated with each inbound source at the time interval to which the ranked list corresponds. At 610, the traffic module 334 may determine a ranked list of outbound sources for each different time interval of at least the first show from measurement data based on a number or percentage of outbound viewers associated with each outbound source at time interval to which the list corresponds. At 612, the traffic module 334 may generate a show performance summary based on one or more of an inbound viewer rate, an outbound viewer rate, a viewer loss percentage, a ranked list of inbound sources, and/or a ranked list of outbound sources.

Figure 7:
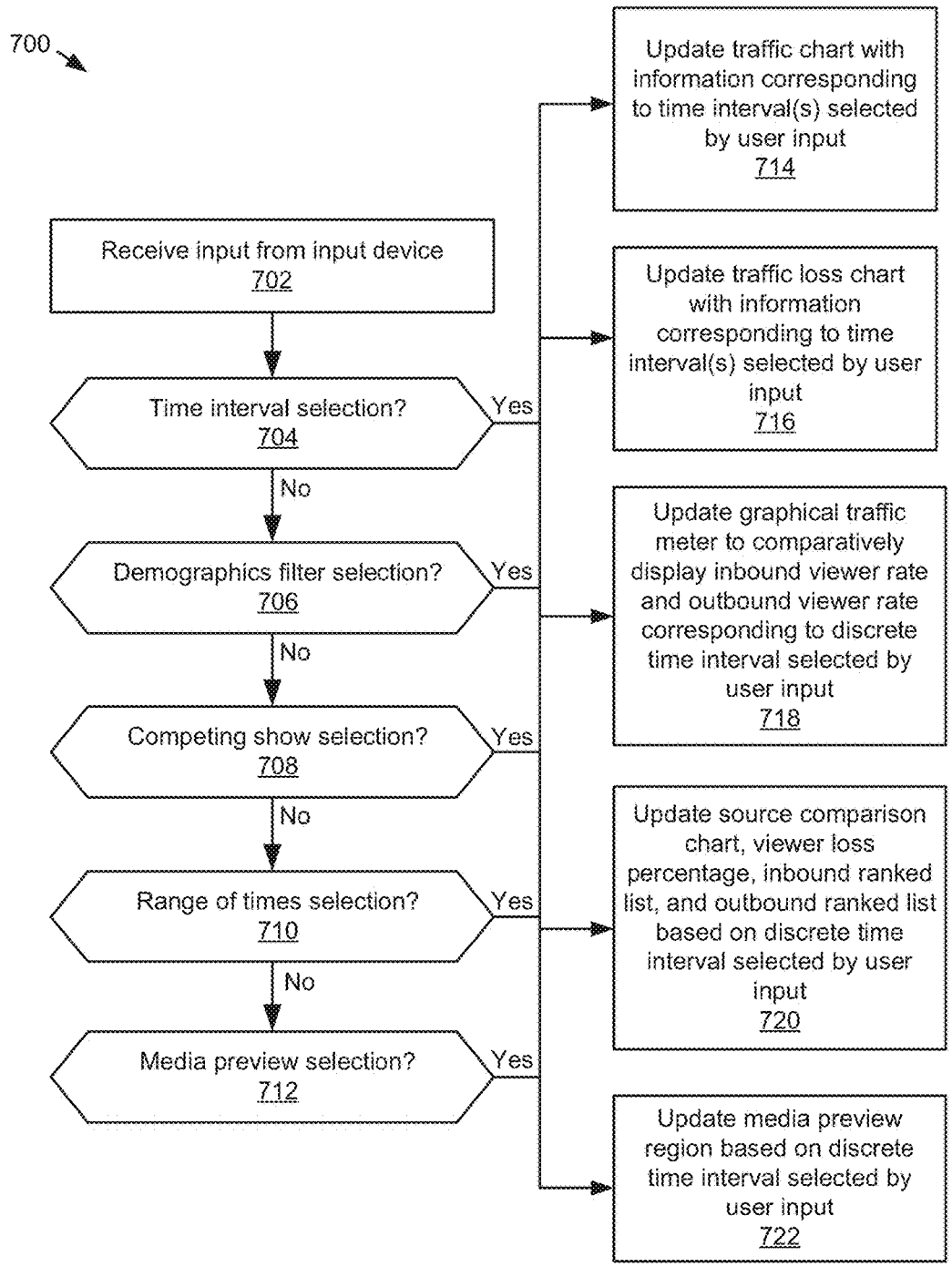
FIG. 7 is a flowchart of an example method for displaying a show performance summary to a user in a useful and easily consumable way based on user input and/or a selected time input.

FIG. 7 is a flowchart of an example method 700 of displaying a show performance summary to a user in a useful and easily consumable way based on user input and/or a selected time interval. At 702, the interface module 316 receives from an input device an input; such as the selection of a time interval, a filter, a first show, etc. as described throughout this disclosure. At 704-712, the interface module 316 determines what type of input has been received and what that input indicates. Once the interface module 316 has received and interpreted the input, it signals various components of the visualization module 308 and/or analytics server 330 to cooperate to determine and provide an updated interface based on the input. In some implementations, the interface module 316 determines whether the input is a time interval selection at 704, a demographics filter selection at 706, a selection of a competing show at 708, a selection of a range of times at 710 (e.g., a selection of a time or to update the time selection in real time), or a selection of a video preview at 712.

In response to one or more of the determinations performed in steps 704-712, the interface module 316 updates one or more of the elements of the interface 322 or 822. In some implementations, as indicated in FIG. 7, the updating steps 714-722 occur synchronously thereby providing a fluid user experience where the user can easily analyze the performance of a first show and one or more competing shows at various time intervals and/or using various filters. For example, the traffic chart module 312 may update a traffic chart with information corresponding to the user input at 714. At 716, the loss chart module 318 may update a traffic loss chart with information corresponding to the user input. At 718, the meter module 314 updates a graphical traffic meter to comparatively display an inbound viewer rate and outbound viewer rate corresponding to the user input. At 720, the meter module 314 updates a source comparison chart, viewer loss percentage, inbound ranked list, and/or outbound ranked list based on the user input. At 722, the media module 356 may update the media preview region 890 to include a media object corresponding to the selected time interval. For example, the components of the visualization module 308 may access the applicable data (e.g., as indexed by time interval) in the data store, which the components use to calculate and generate each element of at least the traffic chart, the traffic loss chart, the graphical traffic meter, and the source comparison chart, as described in more detail elsewhere herein.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code (e.g., computer logic, such as software logic, hardware logic, etc.), such as the computing system and/or devices discussed herein, may include at least one processor coupled directly or indirectly to memory elements through a system bus. The memory(ies) elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus and may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    generating at a user device a dynamic user-interactable graphical interface using a performance summary including viewer traffic statistics for a first show, the performance summary including an inbound viewer rate and an outbound viewer rate for each of a plurality of discrete time intervals of the first show, the dynamic user-interactable graphical interface including a graphical traffic meter that visually comparatively displays the inbound viewer rate and the outbound viewer rate corresponding to a selected time interval;
    providing the dynamic user-interactable graphical interface for display via a display device associated with the user device;
    receiving from an input device associated with the user device a user input selecting from the dynamic user-interactable graphical interface a time interval of the first show; and
    updating the graphical traffic meter of the dynamic user-interactable graphical interface to comparatively display the inbound viewer rate and the outbound viewer rate corresponding to the time interval selected by the user input.

2. The computer-implemented method of claim 1, wherein
    generating the dynamic user-interactable graphical interface includes generating a virtual handle draggable within the dynamic user-interactable graphical interface by a user to isolate a viewer traffic associated with a certain discrete time interval from among the plurality of discrete time intervals, and
    the time interval selected by the user input is the certain discrete time interval selected by the user using the virtual handle.

3. The computer-implemented method of claim 1, wherein
    the viewer traffic statistics further include viewer traffic statistics for one or more competing shows at the discrete time intervals,
    the dynamic user-interactable graphical interface graphically displays a comparison of inbound and outbound viewer traffic between the first show and the one or more competing shows at the discrete time intervals, and
    the user input selecting from the dynamic user-interactable graphical interface the time interval of the first show includes a time interval of the first show and the one or more competing shows, and
    the method further comprises:
        updating the dynamic user-interactable graphical interface provided for display via the display device with the comparison of the inbound and outbound viewer traffic between the first show and the one or more competing shows at the time interval selected by the user input.

4. The computer-implemented method of claim 3, wherein
    the performance summary includes an average total number of viewers at each of the discrete time intervals for each of the first show and the one or more competing shows,
    generating the dynamic user-interactable graphical interface includes generating a traffic chart using the average total number of viewers for each of the first show and the one or more competing shows, the traffic chart visually comparatively displaying a traffic rate of the first show to one or more traffic rates associated with the one or more competing shows, respectively, and
    updating the dynamic user-interactable graphical interface includes synchronously updating the graphical traffic meter and the traffic chart with information corresponding to the time interval selected by the user input.

5. The computer-implemented method of claim 3, wherein the performance summary includes commercial occurrence data reflecting one or more commercials presented during a showing of the first show and including one or more timestamps associated with the one or more commercials reflecting when the one or more commercials occurred, and generating the dynamic user-interactable graphical interface includes generating one or more visual overlays corresponding to the one or more timestamps of the one or more commercials and including the one or more visual overlays in the comparison of the inbound and outbound viewer traffic between the first show and the one or more competing shows at the discrete time intervals.

6. The computer-implemented method of claim 1, further comprising:

aggregating measurement data via a computer network from one or more information sources, the measurement data including raw viewer traffic statistics for the discrete time intervals of the first show, the first show being viewable by viewers via one or more viewing platforms and being associated with a first content provider; and generating using a server device or the user device the performance summary based on the measurement data.

7. The computer-implemented method of claim 6, wherein generating the performance summary based on the measurement data includes determining, using the raw viewer traffic statistics, the inbound viewer rate and the outbound viewer rate for each of the discrete time intervals of the first show, and one or more inbound viewer rates and one or more outbound viewer rates for each of the discrete time intervals of the one or more competing shows, determining, using the raw viewer traffic statistics, a viewer loss percentage for each of the discrete time intervals, determining, using the raw viewer traffic statistics, a ranked list of inbound sources for each of the discrete time intervals of the first show, the ranked list of inbound sources being ranked based on a number of inbound viewers associated with each of the inbound sources at a time interval to which the ranked list of inbound sources corresponds, and determining, using the raw viewer traffic statistics, a ranked list of outbound sources for each of the discrete time intervals of the first show, the ranked list of outbound sources being ranked based on a number of outbound viewers associated with each of the outbound sources at a time interval to which the ranked list of outbound sources corresponds.

8. The computer-implemented method of claim 6, wherein aggregating the measurement data includes receiving the measurement data from the one or more information sources in real-time, near real-time or delayed time.

9. The computer-implemented method of claim 6, wherein the one or more information sources include one or more of a third-party audience measurement service and an information system associated with the first content provider.

10. The computer-implemented method of claim 6, wherein the one or more viewing platforms include one or more of Internet-connected devices, over-the-air televisions, cable televisions, and satellite televisions.

11. The computer-implemented method of claim 3, wherein generating the dynamic user-interactable graphical interface includes generating a show preview region, and updating the dynamic user-interactable graphical interface includes updating the show preview region with a media object corresponding to a portion of the show corresponding to the time interval selected by the user input.

12. The computer-implemented method of claim 1, wherein the performance summary includes a ranked list of inbound sources for each of the discrete time intervals of the first show and a ranked list of outbound sources for each of the discrete time intervals of the first show, generating the graphical traffic meter includes generating a source comparison chart in association with the graphical traffic meter that visually comparatively displays the ranked list of inbound sources and the ranked list of outbound sources for the selected time interval, and the method further comprises:

synchronously updating the source comparison chart and the graphical traffic meter based on the time interval selected by the user input.

13. The computer-implemented method of claim 1, wherein the performance summary includes viewer loss percentages for each of the discrete time intervals of the first show, generating the dynamic user-interactable graphical interface includes generating a traffic loss chart using the viewer loss percentages of the first show, and the method further comprises:

synchronously updating the traffic loss chart and the graphical traffic meter using information corresponding to the time interval selected by the user input.

14. A computing system comprising:

one or more hardware processors; and one or more memories storing instructions, which when executed by the one or more hardware processors, cause the computing system to perform operations comprising:

generating a dynamic user-interactable graphical interface using a performance summary including viewer traffic statistics for a first show, the performance summary including an inbound viewer rate and an outbound viewer rate for each of a plurality of discrete time intervals of the first show, the dynamic user-interactable graphical interface including a graphical traffic meter that visually comparatively displays the inbound viewer rate and the outbound viewer rate corresponding to a selected time interval;

providing the dynamic user-interactable graphical interface for display via a display device;

receiving from an input device a user input selecting from the dynamic user-interactable graphical interface a time interval of the first show; and updating the graphical traffic meter of the dynamic user-interactable graphical interface to comparatively display the inbound viewer rate and the outbound viewer rate corresponding to the time interval selected by the user input.

15. The computing system of claim 14, wherein the instructions, which when executed by the one or more hardware processors, cause the computing system to perform operations comprising:

generating the dynamic user-interactable graphical interface includes generating a virtual handle draggable within the dynamic user-interactable graphical interface by a user to isolate a viewer traffic associated with a certain discrete time interval from among the plurality of discrete time intervals, and the time interval selected by the user input is the certain discrete time interval selected by the user using the virtual handle.

16. The computing system of claim 14, wherein the viewer traffic statistics further include viewer traffic statistics for one or more competing shows at the discrete time intervals, the dynamic user-interactable graphical interface graphically displays a comparison of inbound and outbound viewer traffic between the first show and the one or more competing shows at the discrete time intervals, the user input selecting from the dynamic user-interactable graphical interface the time interval of the first show includes a time interval of the first show and the one or more competing shows, and the instructions, which when executed by the one or more hardware processors, further cause the computing system to perform operations comprising:

updating the dynamic user-interactable graphical interface provided for display via the display device with the comparison of the inbound and outbound viewer traffic between the first show and the one or more competing shows at the time interval selected by the user input.

17. The computing system of claim 16, wherein the performance summary includes an average total number of viewers at each of the discrete time intervals for each of the first show and the one or more competing shows, generating the dynamic user-interactable graphical interface includes generating a traffic chart using the average total number of viewers for each of the first show and the one or more competing shows, the traffic chart visually comparatively displaying a traffic rate of the first show to one or more traffic rates associated with the one or more competing shows, respectively, and updating the dynamic user-interactable graphical interface includes synchronously updating the graphical traffic meter and the traffic chart with information corresponding to the time interval selected by the user input.

18. The computing system of claim 16, wherein the performance summary includes commercial occurrence data reflecting one or more commercials presented during a showing of the first show and including one or more timestamps associated with the one or more commercials reflecting when the one or more commercials occurred, and generating the dynamic user-interactable graphical interface includes generating one or more visual overlays corresponding to the one or more timestamps of the one or more commercials and including the one or more visual overlays in the comparison of the inbound and outbound viewer traffic between the first show and the one or more competing shows at the discrete time intervals.

19. The computing system of claim 14, further comprising:

aggregating measurement data via a computer network from one or more information sources, the measurement data including raw viewer traffic statistics for the discrete time intervals of the first show, the first show being viewable by viewers via one or more viewing platforms and being associated with a first content provider; and generating using a server device or a user device the performance summary based on the measurement data.

20. The computing system of claim 19, wherein generating the performance summary based on the measurement data includes determining, using the raw viewer traffic statistics, the inbound viewer rate and the outbound viewer rate for each of the discrete time intervals of the first show, and one or more inbound viewer rates and one or more outbound viewer rates for each of the discrete time intervals of the one or more competing shows, determining, using the raw viewer traffic statistics, a viewer loss percentage for each of the discrete time intervals, determining, using the raw viewer traffic statistics, a ranked list of inbound sources for each of the discrete time intervals of the first show, the ranked list of inbound sources being ranked based on a number of inbound viewers associated with each of the inbound sources at a time interval to which the ranked list of inbound sources corresponds, and determining, using the raw viewer traffic statistics, a ranked list of outbound sources for each of the discrete time intervals of the first show, the ranked list of outbound sources being ranked based on a number of outbound viewers associated with each of the outbound sources at a time interval to which the ranked list of outbound sources corresponds.

21. The computing system of claim 19, wherein aggregating the measurement data includes receiving the measurement data from the one or more information sources in real-time, near real-time or delayed time.

22. The computing system of claim 19, wherein the one or more information sources include one or more of a third-party audience measurement service and an information system associated with the first content provider.

23. The computing system of claim 19, wherein the one or more viewing platforms include one or more of Internet-connected devices, over-the-air televisions, cable televisions, and satellite televisions.

24. The computing system of claim 16, wherein generating the dynamic user-interactable graphical interface includes generating a show preview region, and updating the dynamic user-interactable graphical interface includes updating the show preview region with a media object corresponding to a portion of the show corresponding to the time interval selected by the user input.

25. The computing system of claim 14, wherein the performance summary includes a ranked list of inbound sources for each of the discrete time intervals of the first show and a ranked list of outbound sources for each of the discrete time intervals of the first show, generating the graphical traffic meter includes generating a source comparison chart in association with the graphical traffic meter that visually comparatively displays the ranked list of inbound sources and the ranked list of outbound sources for the selected time interval, and the instructions, which when executed by the one or more hardware processors, further cause the computing system to perform operations comprising:

synchronously updating the source comparison chart and the graphical traffic meter based on the time interval selected by the user input.

26. The computing system of claim 14, wherein
the performance summary includes viewer loss percentages for each of the discrete time intervals of the first show,
generating the dynamic user-interactable graphical interface includes generating a traffic loss chart using the viewer loss percentages of the first show, and
the instructions, which when executed by the one or more hardware processors, further cause the computing system to perform operations comprising:
synchronously updating the traffic loss chart and the graphical traffic meter using information corresponding to the time interval selected by the user input.

* * * * *